(12) United States Patent
Abdelghaffar et al.

(10) Patent No.: US 12,550,152 B2
(45) Date of Patent: Feb. 10, 2026

(54) AVAILABLE SLOT DETERMINATION FOR APERIODIC SRS TRIGGERING BASED ON AN UNCONFIGURED DCI CODE POINT

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Sanghoon Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/934,430

(22) Filed: Sep. 22, 2022

(65) Prior Publication Data

US 2023/0116653 A1    Apr. 13, 2023

Related U.S. Application Data

(60) Provisional application No. 63/254,999, filed on Oct. 12, 2021.

(51) Int. Cl.
*H04W 72/23* (2023.01)
*H04L 5/00* (2006.01)
*H04W 72/0446* (2023.01)

(52) U.S. Cl.
CPC ........... *H04W 72/23* (2023.01); *H04L 5/0048* (2013.01); *H04W 72/0446* (2013.01)

(58) Field of Classification Search
CPC ............. H04W 72/0446; H04W 72/23; H04W 72/231; H04W 72/232; H04W 72/0453; H04W 72/20; H04W 72/21; H04W 24/02; H04W 72/044; H04W 72/1273; H04W 72/535; H04W 8/24; H04W 52/0229; H04W 52/0232; H04W 52/0235;

(Continued)

(56) References Cited

U.S. PATENT DOCUMENTS

| 2018/0115357 A1 | 4/2018 | Park et al. |
| 2019/0174466 A1* | 6/2019 | Zhang ............ H04L 5/0057 |
| 2021/0058910 A1* | 2/2021 | Yokomakura ...... H04L 5/0048 |

(Continued)

OTHER PUBLICATIONS

3GPP TS 38.214: "3rd Generation Partnership Project, Technical Specification Group Radio Access Network, NR, Physical layer procedures for data (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000310, 171 Pages.

(Continued)

*Primary Examiner* — Marcus Smith
*Assistant Examiner* — Zhaohui Yang
(74) *Attorney, Agent, or Firm* — Guang Y. Zhang; Shumaker & Sieffert, PA

(57) ABSTRACT

Aspects of the disclosure relate to the determination of an available slot for a triggered aperiodic sounding reference signal (A-SRS) resource set when a triggering downlink control information (triggering DCI) indicates a DCI code point that is not configured for that A-SRS resource set. Other aspects, embodiments, and features are also claimed and described.

21 Claims, 14 Drawing Sheets

(58) Field of Classification Search
CPC ............. H04W 72/1268; H04W 76/30; H04W 56/0045; H04W 80/02; H04W 16/28; H04L 5/0048

See application file for complete search history.

(56) References Cited

U.S. PATENT DOCUMENTS

| | | | | |
|---|---|---|---|---|
| 2022/0029861 | A1* | 1/2022 | Shahmohammadian | ................... H04L 5/0048 |
| 2024/0154758 | A1* | 5/2024 | Shi | ........................ H04L 5/0051 |

OTHER PUBLICATIONS

Interdigital, et al., "Further Details on SRS Enhancements", R1-2108813, 3GPP TSG RAN WG1 #106b-e, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052057881, 10 Pages.

LG Electronics: "Enhancements on SRS Flexibility, Coverage and Capacity", R1-2110082, 3GPP TSG RAN WG1 #106bis-e, 3rd Generation Partnership Project (3GPP), Mobile Competence Centre, 650, Route Des Lucioles, F-06921 Sophia-Antipolis Cedex, France, vol. RAN WG1, No. e-Meeting; Oct. 11, 2021-Oct. 19, 2021, Oct. 2, 2021, XP052059018, 11 Pages.

NTT Docomo, et al., "Discussion on SRS Enhancement", R1-2109663, 3GPP TSG RAN WG1 #106b-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052058604, 13 Pages.

Partial International Search Report—PCT/US2022/076915—ISA/EPO—Jan. 17, 2023.

Qualcomm Incorporated: "Discussion on SRS Enhancement", 3GPP TSG-RAN WG1 Meeting #104bis-e, R1-2103155, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177955, 28 Pages.

International Search Report and Written Opinion—PCT/US2022/076915—ISA/EPO—Mar. 13, 2023.

European Search Report—EP24217600—Search Authority—Munich—Jun. 4, 2025 19 pp.

Futurewei: "Enhancements on SRS flexibility, coverage and capacity", 3GPP TSG RAN WG1 Meeting #104bis-e, R1-2102765, 3rd Generation Partnership Project, Mobile Competence Centre, 650, Route Des Lucioles, F-06921, Sophia-Antipolis Cedex, France, vol. RAN WG1, No. e-Meeting, Apr. 12, 2021-Apr. 20, 2021, Apr. 7, 2021, 33 Pages, XP052177747, Section 2.

LG Electronics: "Enhancements on SRS flexibility, coverage and capacity", 3GPP TSG RAN WG1 #106-e, R1-2107819, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 7, 2021, 10 Pages, XP052038690, p. 9.

Partial European Search Report—EP24217600—Search Authority—The Hague—Mar. 11, 2025 21 pp.

* cited by examiner

AVAILABLE SLOT DETERMINATION FOR APERIODIC SRS TRIGGERING BASED ON AN UNCONFIGURED DCI CODE POINT

PRIORITY CLAIM

This application claims priority to and the benefit of provisional patent application No. 63/254,999, filed in the United States Patent and Trademark Office on Oct. 12, 2021, the entire content of which is incorporated herein by reference as if fully set forth below in its entirety and for all applicable purposes.

TECHNICAL FIELD

The technology discussed below relates generally to wireless communication systems, and more particularly, to reference signal transmission timing. Some aspects may include enabling and providing communication devices configured to transmit an asynchronous, on-demand sounding reference signal.

INTRODUCTION

In many modern wireless communication systems, channel measurements and feedback of channel state information are used to support advanced communication techniques. For example, a transmitting device may transmit a reference signal (RS) for measurement by a receiving device. Once it makes suitable channel measurements or characterization based on the reference signal that passed through the channel between the transmitting and receiving devices, the receiving device can transmit feedback including information that may characterize one or more properties or parameters of the channel.

The accuracy and usefulness of such channel measurements wanes with time. As the communication devices move, other objects move or otherwise change within the space between the communication devices, or other changes occur, channel state feedback relates to older and older channel state that can become drastically different over long enough times. However, the transmission of too-frequent channel state feedback can result in an unacceptable increase in signaling overhead, reducing data throughput between the communication devices. Many different reference signal and channel state feedback timing mechanisms have been used in the field, including periodic reference signal transmissions, and aperiodic, or on-demand reference signal transmissions.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides an apparatus for wireless communication. The apparatus includes a memory and a processor coupled to the memory. The processor is configured to transmit an aperiodic sounding reference signal (A-SRS)-triggering downlink control information (DCI) that includes an A-SRS request indicator for indicating a plurality of A-SRS resource sets, and a DCI code point for indicating an available slot. The processor is further configured to receive an A-SRS corresponding to the A-SRS-triggering DCI, wherein the DCI code point maps to an available slot offset value that is configured for each A-SRS resource set of the plurality of A-SRS resource sets.

In further aspects, the present disclosure provides an apparatus for wireless communication. The apparatus includes a memory and a processor coupled to the memory. The processor is configured to receive an aperiodic sounding reference signal (A-SRS)-triggering downlink control information (DCI) that includes an A-SRS request indicator for indicating one or more A-SRS resource sets, and a DCI code point for indicating an available slot. The processor is further configured to transmit an A-SRS corresponding to a triggered A-SRS resource set indicated in the A-SRS request indicator when the DCI code point maps to an available slot offset value that is configured for the indicated A-SRS resource set, and to transmit an A-SRS corresponding to at least one triggered A-SRS resource set indicated in the A-SRS request indicator utilizing a default behavior when the DCI code point maps to an available slot offset value that is not configured for the at least one triggered A-SRS resource set.

In still further aspects, the present disclosure provides an apparatus for wireless communication. The apparatus includes a memory and a processor coupled to the memory. The processor is configured to transmit a capability information signal indicating a capability to support an aperiodic sounding reference signal (A-SRS) triggering procedure based on a triggering downlink control information (DCI) that includes an available slot offset value, and to receive a radio bearer configuration message for configuring a bandwidth, the radio bearer configuration message comprising an indication of support of the A-SRS triggering procedure based on the triggering DCI that includes the available slot offset value.

In still further aspects, the present disclosure provides a method of wireless communication operable at a scheduled entity. The method includes transmitting a capability information signal indicating a capability to support an aperiodic sounding reference signal (A-SRS) triggering procedure based on a triggering downlink control information (DCI) that includes an available slot offset value, and receiving a radio bearer configuration message for configuring a bandwidth, the radio bearer configuration message comprising an indication of support of the A-SRS triggering procedure based on the triggering DCI that includes the available slot offset value.

Various aspects of the technology discussed herein will become more fully understood upon a review of the detailed description, which follows. Other aspects and features will become apparent to those of ordinary skill in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementation examples and/or uses may come about via integrated chip (IC) and other non-module component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

Wireless Communication Network

Figure 1:
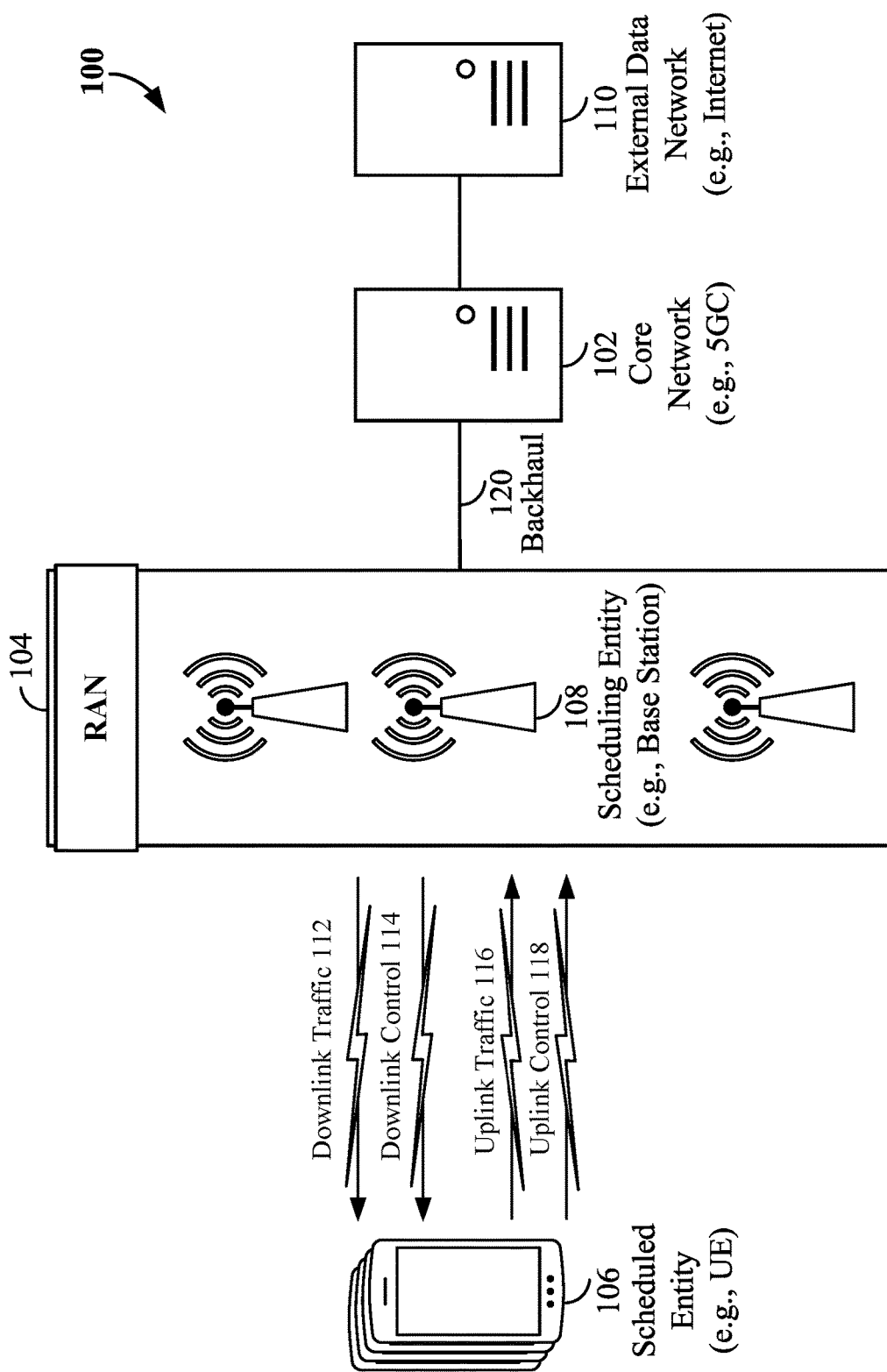
FIG. 1 is a schematic illustration of a wireless communication system according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology.

The radio access network (RAN) 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface or may indirectly communicate with one another over a network (e.g., a local area network or LAN).

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., network node 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a network node 108) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by a scheduling entity 108.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node 108 may broadcast downlink traffic 112 to one or more UEs 106. Broadly, the network node 108 is a node or device responsible for scheduling traffic in a wireless communication network, including downlink traffic 112 and, in some examples, uplink traffic 116 from one or more UEs 106 to the network node 108. On the other hand, the UE 106 is a node or device that receives downlink control information 114, including but not limited to scheduling information (e.g., a grant), synchronization or timing information, or other control information from another entity in the wireless communication network such as the network node 108.

In general, network nodes 108 may include a backhaul interface for communication with a backhaul portion 120 of the wireless communication system. The backhaul 120 may provide a link between a network node 108 and the core network 102. Further, in some examples, a backhaul network may provide interconnection between the respective network nodes 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
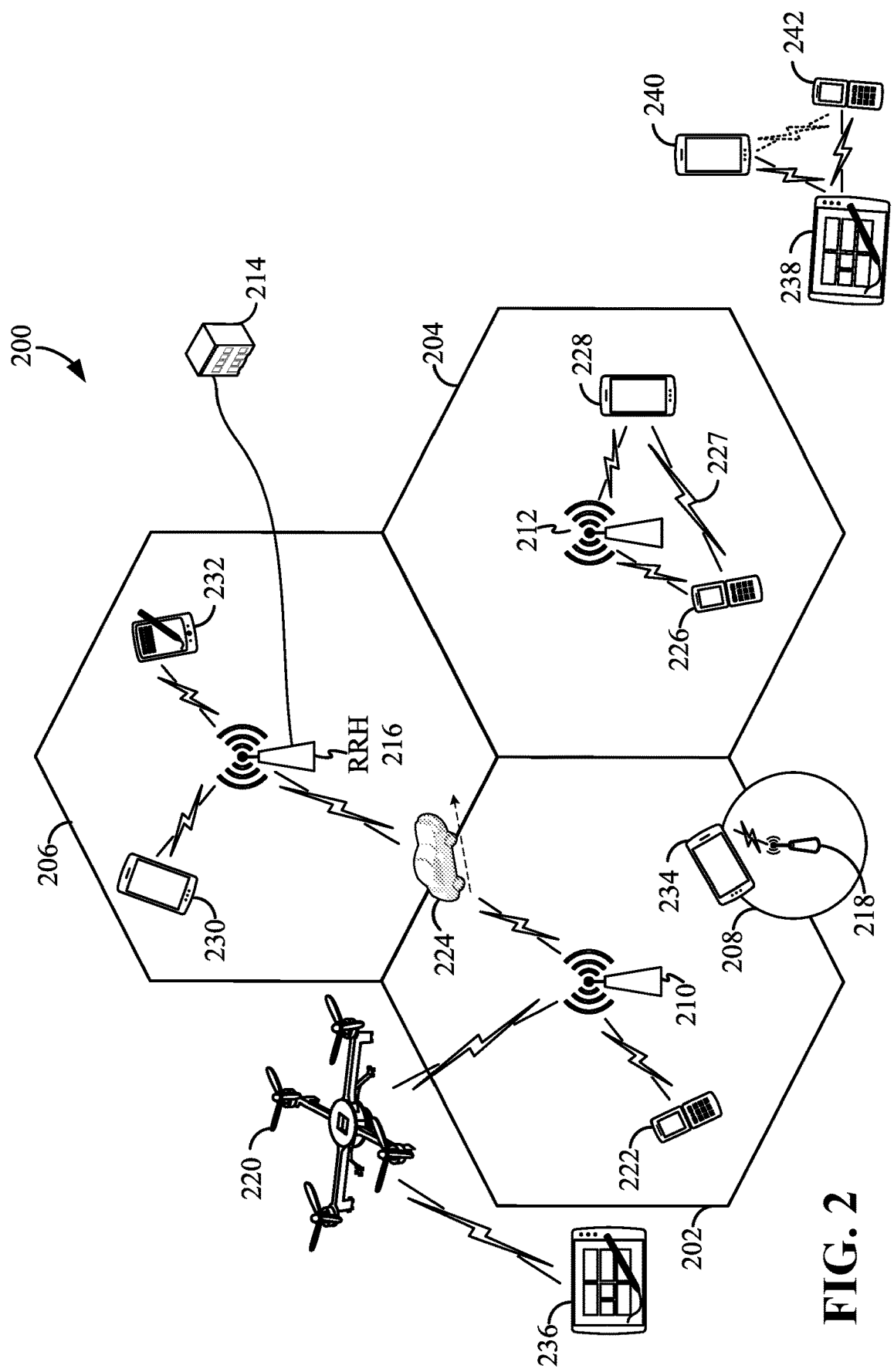
FIG. 2 is a schematic illustration of an example of a radio access network according to some aspects of this disclosure.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, the cells 202, 204, and 206 may be referred to as macrocells, as the network nodes 210, 212, and 214 support cells having a large size. Further, a network node 218 is shown in the small cell 208 (e.g., a microcell, picocell, femtocell, home base station, home Node B, home eNode B, etc.) which may overlap with one or more macrocells. In this example, the cell 208 may be referred to as a small cell, as the network node 218 supports a cell having a relatively small size. Cell sizing can be done according to system design as well as component constraints.

The RAN 200 may include any number of wireless network nodes and cells. Further, a RAN may include a relay node to extend the size or coverage area of a given cell. The network nodes 210, 212, 214, 218 provide wireless access points to a core network for any number of mobile apparatuses. In some examples, the network nodes 210, 212, 214, and/or 218 may be the same as the base station/scheduling entity 108 described above and illustrated in FIG. 1.

FIG. 2 further includes a quadcopter or drone 220, which may be configured to function as a network node. That is, in some examples, a cell may not necessarily be stationary, and the geographic area of the cell may move according to the location of a mobile network node such as the quadcopter 220.

Within the RAN 200, each network node 210, 212, 214, 218, and 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with mobile network node 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with network node 210.

In a further aspect of the RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS 108 (such as a Node B (NB), evolved NB (eNB), NR BS, 5G NB, gNB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
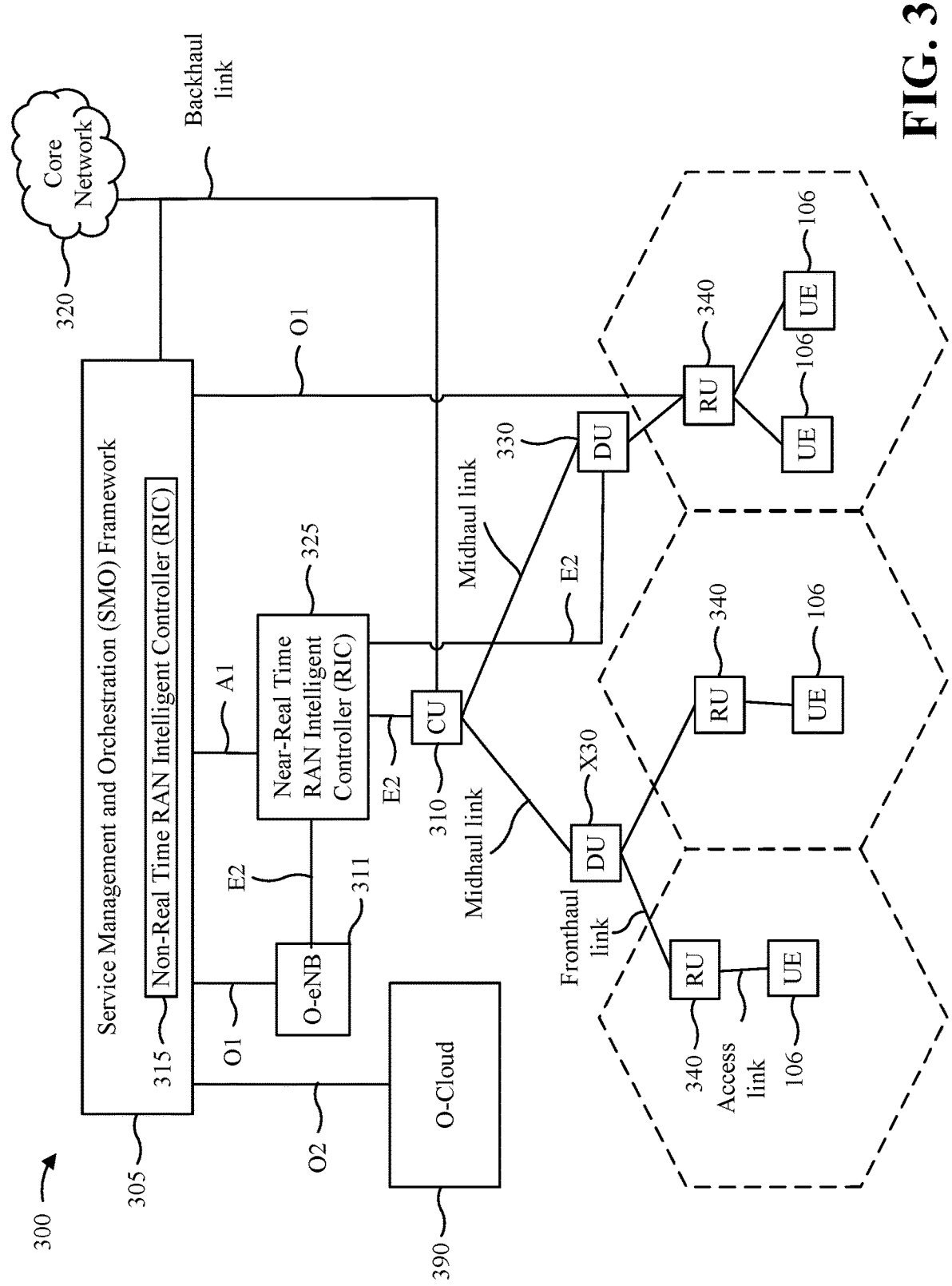
FIG. 3 shows a diagram illustrating an example disaggregated base station architecture according to some aspects of this disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 106 via one or more radio frequency (RF) access links. In some implementations, the UE 106 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 106. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
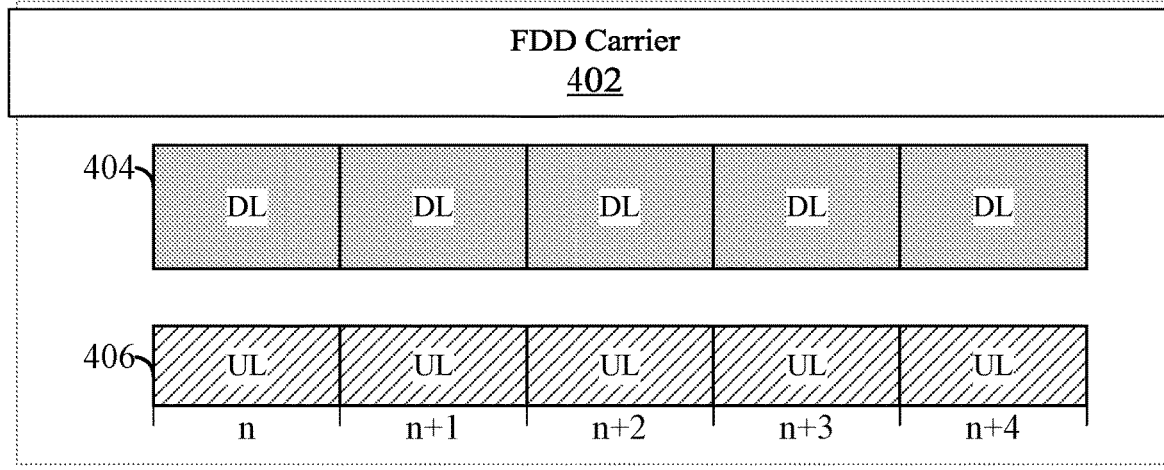
FIG. 4 is a schematic illustration of a sequence of slots in a frequency division duplex (FDD) carrier and in a time division duplex (TDD) carrier according to some aspects of this disclosure.
Figure 4:
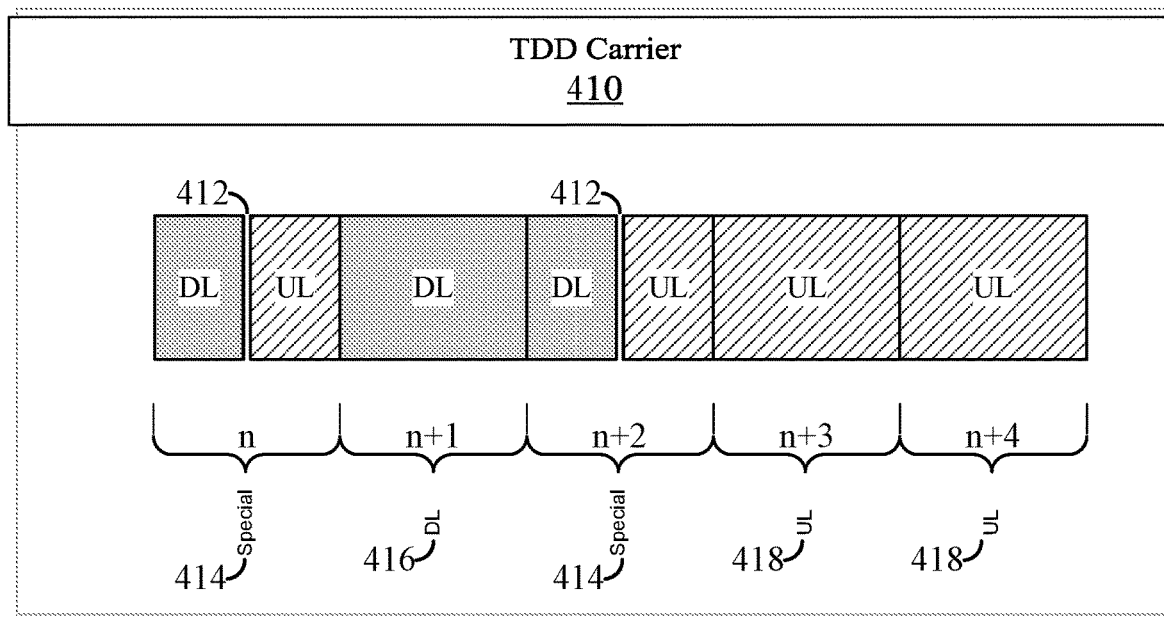

In FIG. 4, an FDD carrier 402 is illustrated showing a sequence of five slots labeled n to n+4. As illustrated, transmissions in a downlink (DL) direction operate on a DL component carrier (CC) 404, and transmissions in a UL direction operate on a UL CC 406 at a different carrier frequency than that of the DL CC 404. FIG. 4 further illustrates a TDD carrier 410, where transmissions in different directions on a given channel or carrier are separated from one another using time division multiplexing. That is, at some times the carrier 410 is dedicated for transmissions in one direction, while at other times the carrier 410 is dedicated for transmissions in the other direction, where the direction may change very rapidly, e.g., several times per slot. In the illustrated example, slot n+1 (416) is for transmissions in the DL direction, and slots n+3 and n+4 (418) are for transmissions in the UL direction. Slots n and n+2 (414) are so-called special slots that include a DL portion and a UL portion separated by a guard period 412. This guard period accommodates RF switching time at the radios, as well as propagation delays between a base station and UE, to allow time synchronization at the base station or scheduling entity. While the illustrated special slots 414 schematically appear to include approximately half DL and half UL portions, this is merely one example. Those of ordinary skill in the art will acknowledge that any suitable division of a slot between DL and UL portions may be utilized in a given example.

In still further examples, a wireless communication network may employ channel measurements and feedback to support enhanced communication techniques. For example, a transmitting device may transmit a reference signal (RS) for measurement by a receiving device. Once it makes suitable channel measurements or characterization, the receiving device can transmit feedback that may characterize one or more properties or parameters of the channel. In Time Division Duplex (TDD) systems, the UL and DL may be reciprocal, in that each uses different time slots of the same frequency bandwidth. Therefore, in TDD systems, a transmitter may configure DL transmissions based on an UL channel measurement (e.g., based on a sounding reference signal (SRS) or other pilot signal transmitted from the receiver).

In some examples, a wireless network may support carrier aggregation. That is, a RAN may provide for aggregation of any suitable number of two or more FDD carriers 402 and/or TDD carriers 410.

Figure 5:
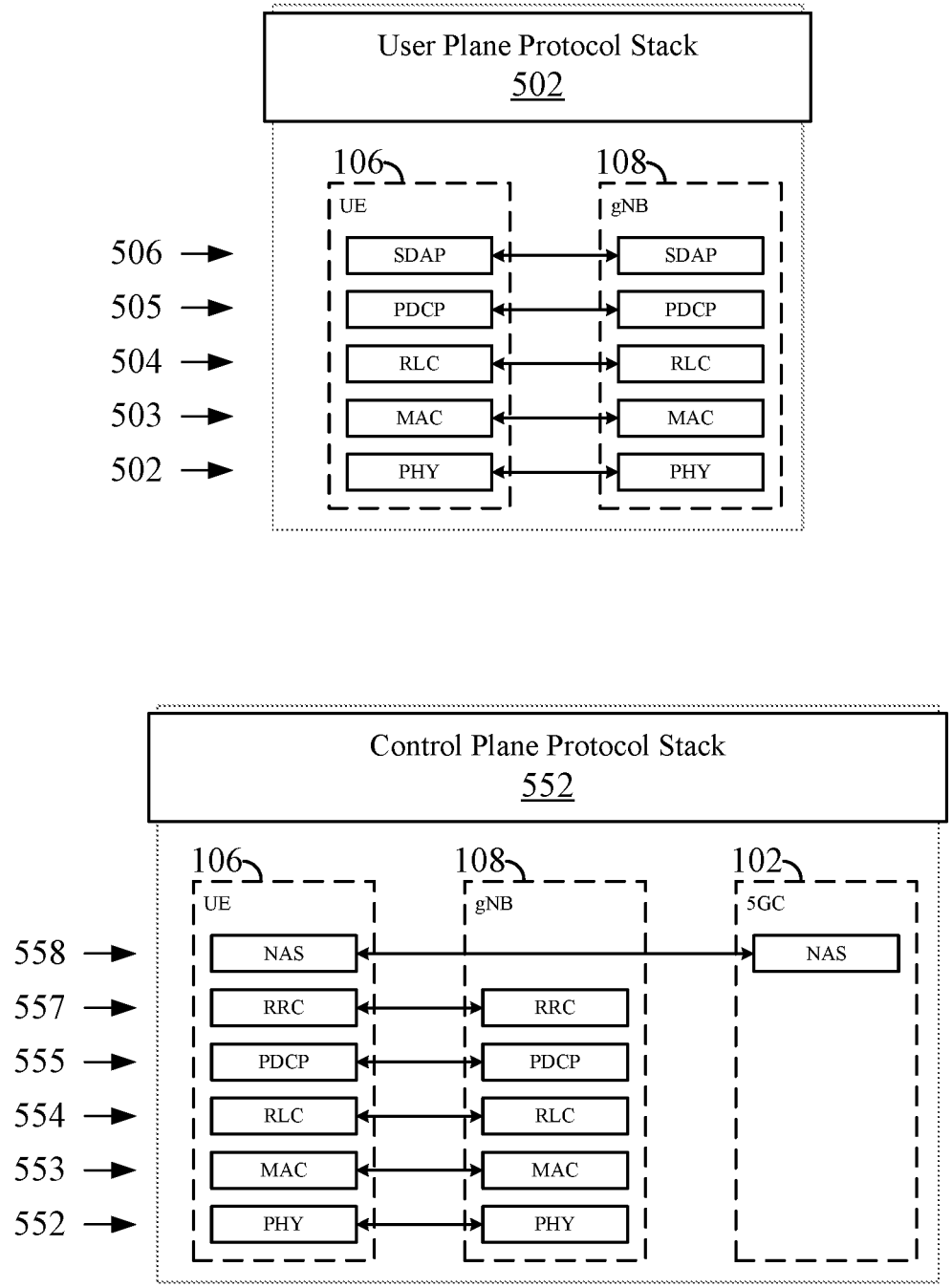
FIG. 5 is a schematic illustration of the radio protocol architecture for the user plane and for the control plane according to some aspects of this disclosure.

FIG. 5 is a schematic illustration of a user plane protocol stack 502 and a control plane protocol stack 552 in accordance with some aspects of this disclosure. In a wireless telecommunication system, the communication protocol architecture may take on various forms depending on the particular application. For example, in a 3GPP NR system, the signaling protocol stack is divided into Non-Access Stratum (NAS, 558) and Access Stratum (AS, 502-506 and 552-557) layers and protocols. The NAS protocol 558 provides upper layers, for signaling between a UE 106 and a core network 102 (referring to FIG. 1). The AS protocol 502-506 and 552-557 provides lower layers, for signaling between the RAN 104 (e.g., a gNB or other base station 108) and the UE 106.

Turning to FIG. 5, a radio protocol architecture is illustrated with a user plane protocol stack 502 and a control plane protocol stack 552, showing their respective layers or sublayers. Radio bearers between a base station 108 and a UE 106 may be categorized as data radio bearers (DRB) for carrying user plane data, corresponding to the user plane protocol 502; and signaling radio bearers (SRB) for carrying control plane data, corresponding to the control plane protocol 552.

In the AS, both the user plane 502 and control plane 552 protocols include a physical layer (PHY) 502/552, a medium access control layer (MAC) 503/553, a radio link control layer (RLC) 504/554, and a packet data convergence protocol layer (PDCP) 505/555. PHY 502/552 is the lowest layer and implements various physical layer signal processing functions. The MAC layer 503/553 provides multiplexing between logical and transport channels and is responsible for various functions. For example, the MAC layer 503/553 is responsible for reporting scheduling information, priority handling and prioritization, and error correction through hybrid automatic repeat request (HARQ) operations. The RLC layer 504/554 provides functions such as sequence numbering, segmentation and reassembly of upper layer data packets, and duplicate packet detection. The PDCP layer 505/555 provides functions including header compression for upper layer data packets to reduce radio transmission overhead, security by ciphering the data packets, and integrity protection and verification.

In the user plane protocol stack 502, a service data adaptation protocol (SDAP) layer 506 provides services and functions for maintaining a desired quality of service (QoS). And in the control plane protocol stack 552, a radio resource control (RRC) layer 557 includes a number of functional entities for routing higher layer messages, handling broadcasting and paging functions, establishing and configuring radio bearers, NAS message transfer between NAS and UE, etc.

A NAS protocol layer 558 provides for a wide variety of control functions between the UE 106 and core network 102. These functions include, for example, registration management functionality, connection management functionality, and user plane connection activation and deactivation.

Figure 6:
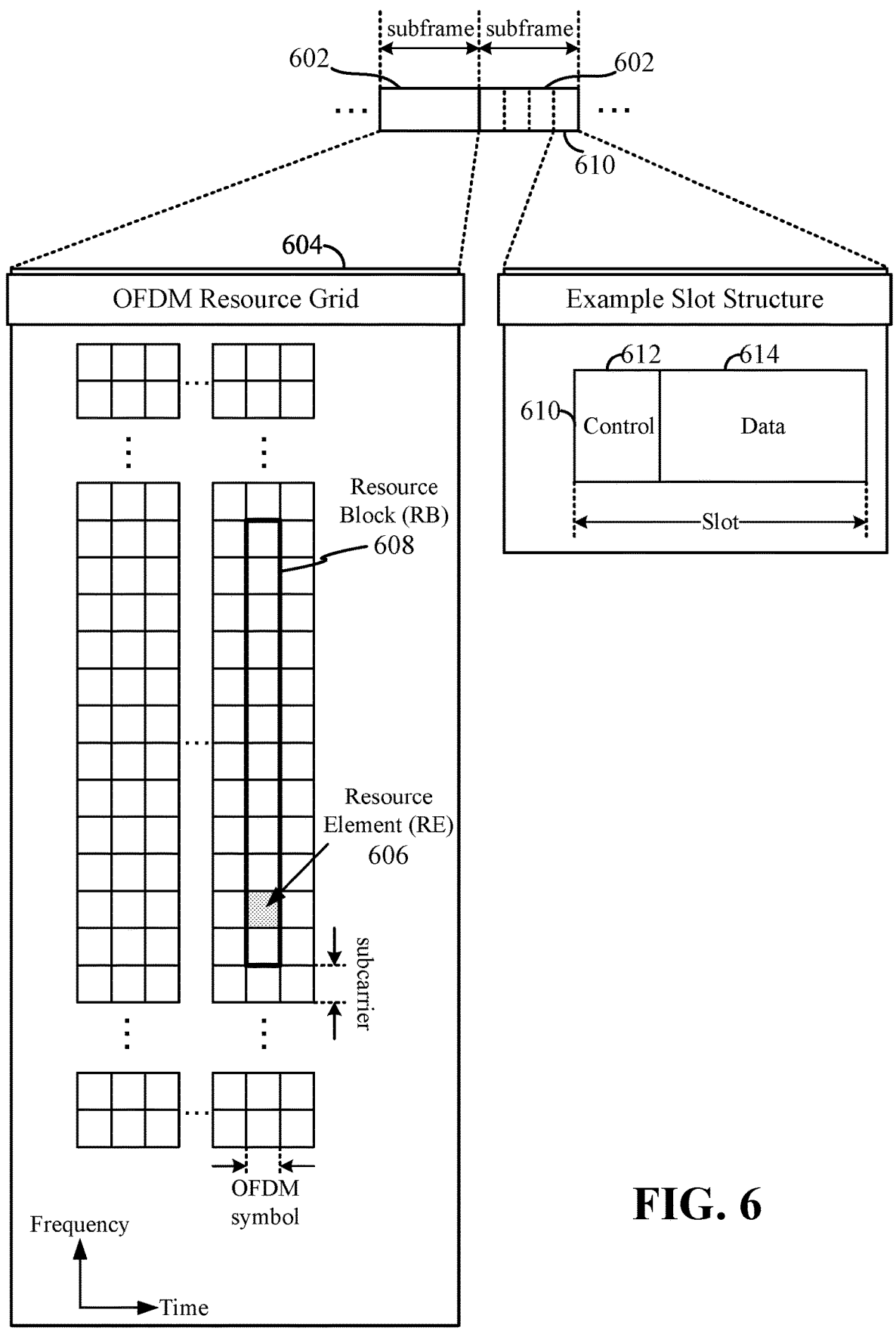
FIG. 6 is a schematic illustration of an organization of wireless resources in an air interface utilizing orthogonal frequency divisional multiplexing (OFDM) according to some aspects of this disclosure.

FIG. 6 schematically illustrates various aspects of the present disclosure with reference to an orthogonal frequency division multiplexing (OFDM) waveform. In general, an air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple sub-carriers. Those of ordinary skill in the art will understand that the various aspects of the present disclosure may be applied to a discrete Fourier transform-spread OFDMA (DFT-s-OFDMA) waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 6 illustrates an expanded view of an exemplary DL subframe 602, showing an OFDM resource grid 604. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 604 may schematically represent time-frequency resources for a given antenna port. That is, in a MIMO implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 608 entirely corresponds to a single direction of communication (either transmission or reception for a given device).

A UE generally utilizes only a subset of the resource grid 604. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 608 occupies less than the entire bandwidth of the subframe 602, with some subcarriers illustrated above and below the RB 608. In a given implementation, the subframe 602 may have a bandwidth corresponding to any number of one or more RBs 608. Further, the RB 608 is shown occupying less than the entire duration of the subframe 602, although this is merely one possible example.

Each 1 ms subframe 602 may consist of one or multiple adjacent slots. In FIG. 6, one subframe 602 includes four slots 610, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 610 illustrates the slot 610 including a control region 612 and a data region 614. In general, the control region 612 may carry control channels (e.g., PDCCH), and the data region 614 may carry data channels (e.g., PDSCH or PUSCH). Of course, a particular slot may contain all DL, all UL, or at least one DL portion and at least one UL portion. The structure illustrated in FIG. 6 is merely exemplary in nature, and different slot structures may be utilized, and may include one or more of each of the control region(s) and data region(s).

Although not illustrated in FIG. 6, the various REs 606 within an RB 608 may carry one or more physical channels, including control channels, shared channels, data channels, etc. Other REs 606 within the RB 608 may also carry pilots or reference signals. These pilots or reference signals may provide for a receiving device to perform channel estimation of the corresponding channel, which may enable coherent demodulation/detection of the control and/or data channels within the RB 608.

In a DL transmission, the transmitting device (e.g., the scheduling entity 108) may allocate one or more REs 606 (e.g., within a control region 612) to carry one or more DL control channels. These DL control channels include DL control information 114 (DCI) that generally carries information originating from higher layers (e.g., a radio resource control (RRC) layer), such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 606 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the UL control channel 118 (e.g., a PUCCH), the scheduling entity 108 may transmit downlink control information (DCI) 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 606 (e.g., within the data region 614) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In some examples, a given carrier or cell may be configured to support a substantially large bandwidth. Depending on a given UE's capabilities, that UE may or may not be capable of using the entire wide bandwidth, or may operate in a scenario where the entire bandwidth is not necessary. To accommodate these and other use cases, a wireless network may provide for UEs with different bandwidth capabilities or needs to operate with different, configurable bandwidths than the full cell bandwidth. For example, a network may divide a carrier or cell into multiple bandwidth parts (BWPs), and may designate any suitable number of one or more BWPs as active BWPs for a given UE. Here, a UE may be configured to utilize resources only within the active BWP(s) for wireless communication, and such UE may not be expected to receive transmissions outside an active BWP.

The channels or carriers described above and illustrated in FIGS. 1 and 6 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Apparatus Block Diagrams

Figure 7:
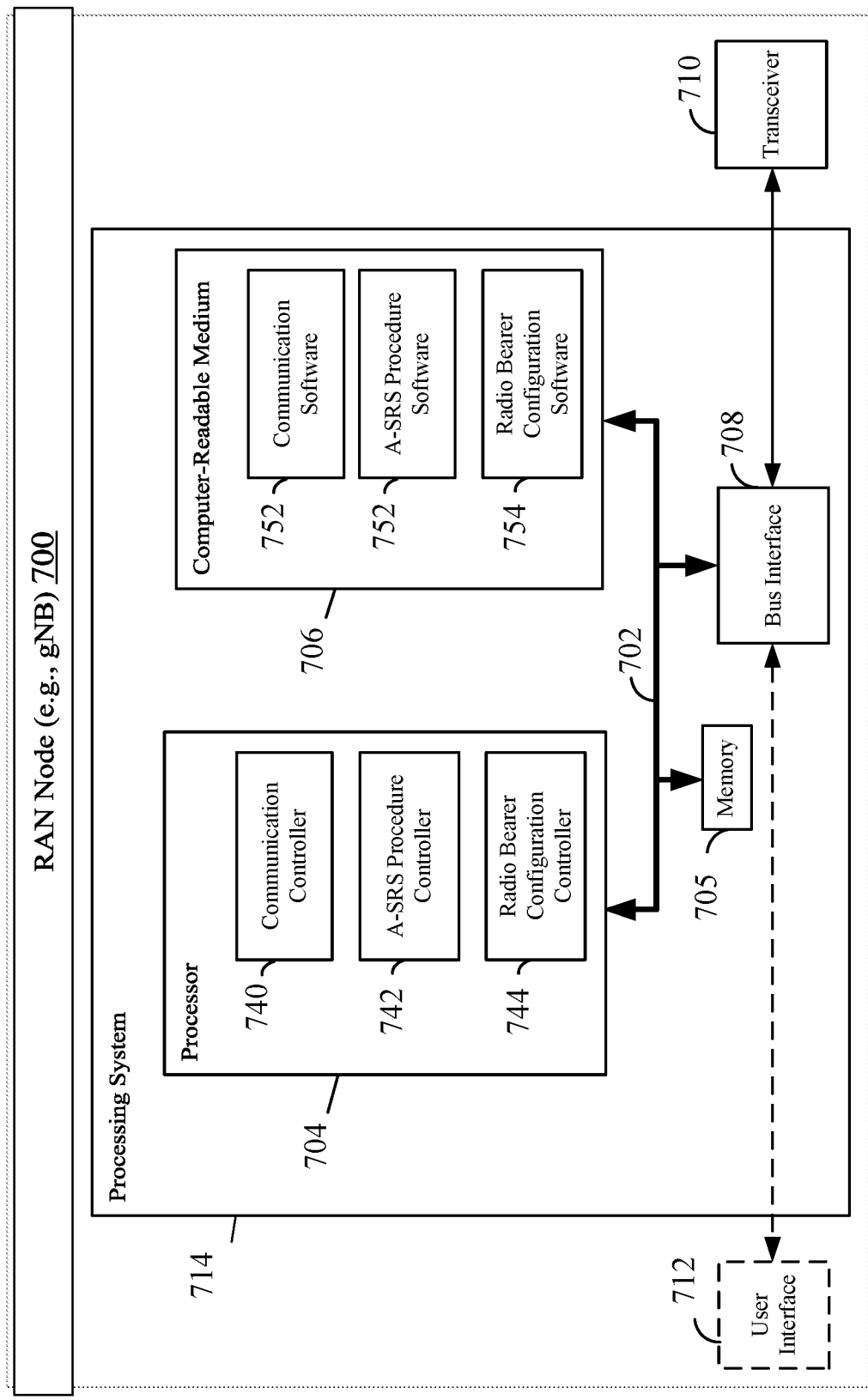
FIG. 7 is a block diagram conceptually illustrating an example of a hardware implementation for a scheduling entity according to some aspects of this disclosure.

FIG. 7 is a block diagram illustrating an example of a hardware implementation for a scheduling entity 700 employing a processing system 714. For example, the scheduling entity 700 may be a user equipment (UE) as illustrated in any one or more of FIGS. 1, 2, and/or 9. In another example, the scheduling entity 700 may be a base station or gNB as illustrated in any one or more of FIGS. 1, 2, and/or 9.

The scheduling entity 700 may include a processing system 714 having one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. For example, the processor 704, as utilized in a scheduling entity 700, may be configured (e.g., in coordination with the memory 705) to implement any one or more of the processes and procedures described below and illustrated in FIG. 11.

The processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and some examples, such as a base station, may omit it.

In some aspects of the disclosure, the processor 704 may include communication controller circuitry 740 configured (e.g., in coordination with the memory 705) for various functions, including, e.g., transmitting and receiving signals and data. For example, the communication controller circuitry 740 may be configured to implement one or more of the functions described below in relation to FIG. 11, including, e.g., block 1104 and/or 1106. In further aspects, the processor 704 may include A-SRS procedure controller circuitry 742 configured (e.g., in coordination with the memory 705) for various functions, including, e.g., transmitting an A-SRS-triggering DCI and receiving an A-SRS corresponding to the A-SRS-triggering DCI. For example, the A-SRS procedure controller circuitry 742 may be configured to implement one or more of the functions described below in relation to FIG. 11, including, e.g., blocks 1102, 1104, and/or 1106. In still further aspects, the processor 704 may include radio bearer configuration controller circuitry 744 configured (e.g., in coordination with the memory 705) for various functions, including, e.g., generating and transmitting radio bearer configuration messages (e.g., RRC control signaling).

The processor 704 is responsible for managing the bus 702 and general processing, including the execution of software stored on the computer-readable medium 706. The software, when executed by the processor 704, causes the processing system 714 to perform the various functions described below for any particular apparatus. The processor 704 may also use the computer-readable medium 706 and the memory 705 for storing data that the processor 704 manipulates when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706. The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 706 may store computer-executable code that includes communication controller software 760 that configures a scheduling entity 700 for various functions, including, e.g., transmitting and receiving signals and data. For example, the communication controller software 760 may be configured to cause a scheduling entity 700 to implement one or more of the functions described below in relation to FIG. 11, including, e.g., blocks 1104 and/or 1106. In further aspects, the computer-readable storage medium may store computer-executable code that includes A-SRS procedure controller software 762 that configures a scheduling entity 700 for various functions, including, e.g., transmitting an A-SRS triggering DCI and receiving an A-SRS corresponding to the A-SRS triggering DCI. For example, the A-SRS procedure controller software 762 may be configured to implement one or more of the functions described below in relation to FIG. 11, including, e.g., blocks 1102, 1104, and/or 1106. In still further aspects, the computer-readable storage medium 706 may include radio bearer configuration controller software 764 that configures a scheduling entity 700 for various functions, including, e.g., generating and transmitting radio bearer configuration messages (e.g., RRC control signaling).

In one configuration, the scheduling entity 700 for wireless communication includes means for generating and transmitting A-SRS-triggering DCIs, means for receiving an A-SRS, means for measuring or characterizing a channel, and means for generating and transmitting radio bearer configuration messages (e.g., RRC control signaling). In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Figure 11:
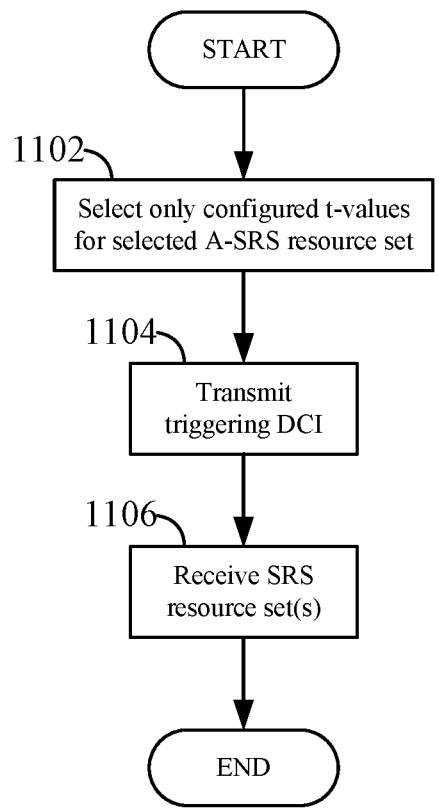
FIG. 11 is a flow chart illustrating an exemplary process for a base station triggering an A-SRS transmission according to some aspects of this disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, and/or 9 and utilizing, for example, the processes and/or algorithms described herein in relation to FIG. 11.

Figure 8:
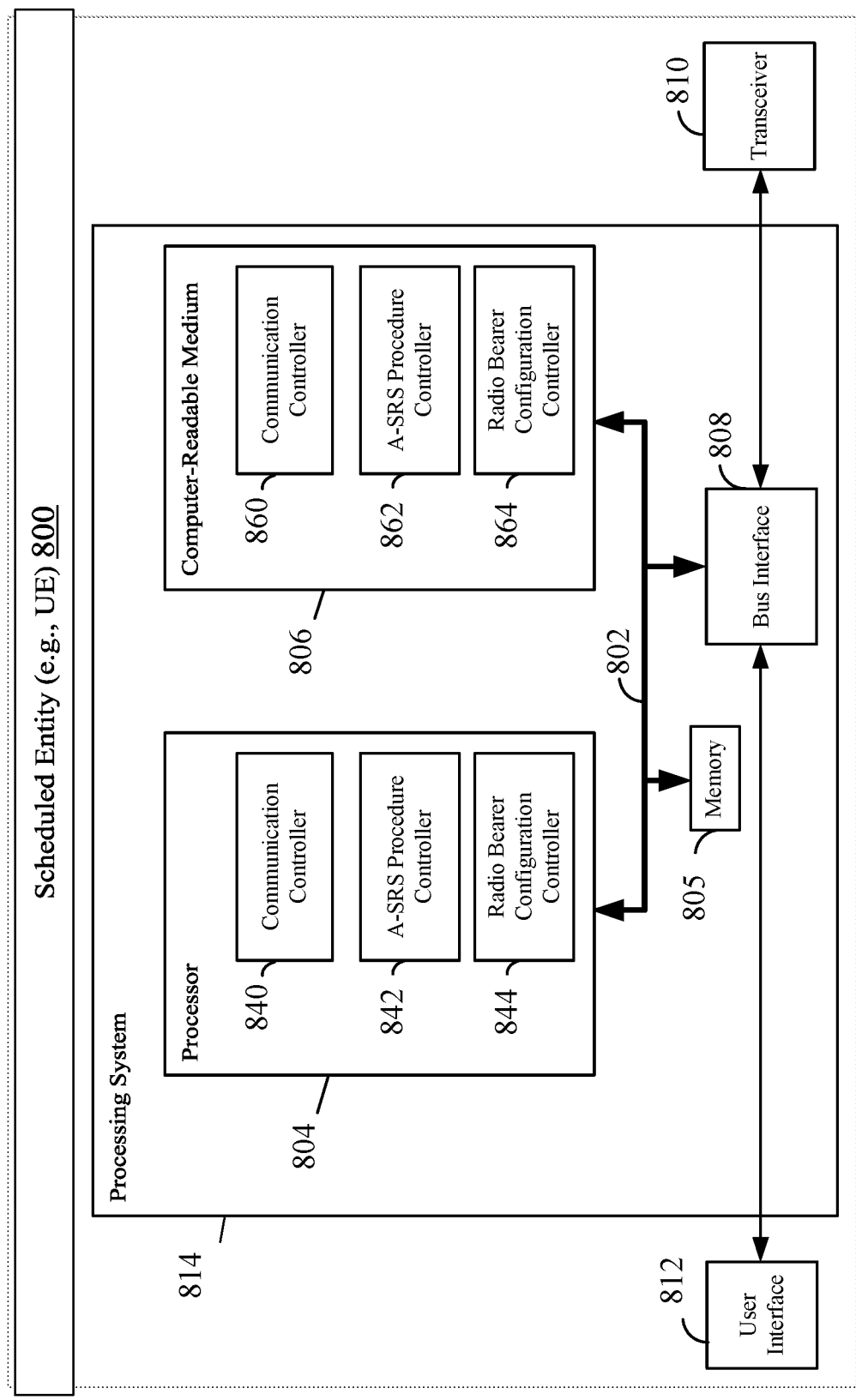
FIG. 8 is a block diagram conceptually illustrating an example of a hardware implementation for a scheduled entity according to some aspects of this disclosure.

FIG. 8 is a conceptual diagram illustrating an example of a hardware implementation for an exemplary scheduled entity 800 employing a processing system 814. In accordance with various aspects of the disclosure, a processing system 814 may include an element, or any portion of an element, or any combination of elements having one or more processors 804. For example, the scheduled entity 800 may be a user equipment (UE) as illustrated in any one or more of FIGS. 1, 2, and/or 9.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be configured (e.g., in coordination with the memory 805) to implement any one or more of the processes described below and illustrated in FIGS. 12, 13, and/or 14.

In some aspects of the disclosure, the processor 804 may include communication controller circuitry 840 configured (e.g., in coordination with the memory 805) for various functions, including, for example, transmitting and receiving data and signaling messages. In further aspects, the processor 804 may include A-SRS procedure controller circuitry 842 configured (e.g., in coordination with the memory 805) for various functions, including, for example, receiving and processing an A-SRS-triggering DCI, determining whether a DCI code point maps to an available slot offset value that is configured for an indicated A-SRS resource set in the A-SRS-triggering DCI, and determining and employing a default behavior when a DCI code point maps to a slot offset value that is unconfigured for an indicated A-SRS resource set. In still further aspects, the processor 804 may include radio bearer configuration controller circuitry 844 configured (e.g., in coordination with the memory 805) for various functions, including, for example, receiving and processing a radio bearer configuration message (e.g., RRC configuration signaling), or determining whether a gNB supports an A-SRS triggering procedure based on the radio bearer configuration message.

And further, the computer-readable storage medium 806 may store computer-executable code that includes communication controller software 860 that configures a scheduled entity 800 for various functions, including, e.g., transmitting and receiving data and signaling messages. In further aspects, the computer-readable storage medium 806 may store computer-executable code that includes A-SRS procedure controller software 862 that configures a scheduled entity 800 for various functions, including, e.g., receiving and processing an A-SRS-triggering DCI, determining whether a DCI code point maps to an available slot offset value that is configured for an indicated A-SRS resource set in the A-SRS-triggering DCI, and determining and employing a default behavior when a DCI code point maps to a slot offset value that is unconfigured for an indicated A-SRS resource set. In still further aspects, the computer-readable storage medium 806 may store computer-executable code that includes radio bearer configuration controller software that configures a scheduled entity 800 for various functions, including, e.g., receiving and processing a radio bearer configuration message (e.g., RRC configuration signaling), or determining whether a gNB supports an A-SRS triggering procedure based on the radio bearer configuration message.

In one configuration, the UE or scheduled entity 800 for wireless communication includes means for receiving an A-SRS-triggering DCI, means for transmitting an A-SRS corresponding to the triggering DCI, means for determining whether a DCI code point maps to an available slot offset value that is configured for a triggered A-SRS resource set, means for receiving and processing a radio bearer configuration message, and means for determining whether a given bandwidth is configured to support an enhanced A-SRS triggering procedure based on its radio bearer configuration. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Figure 12:
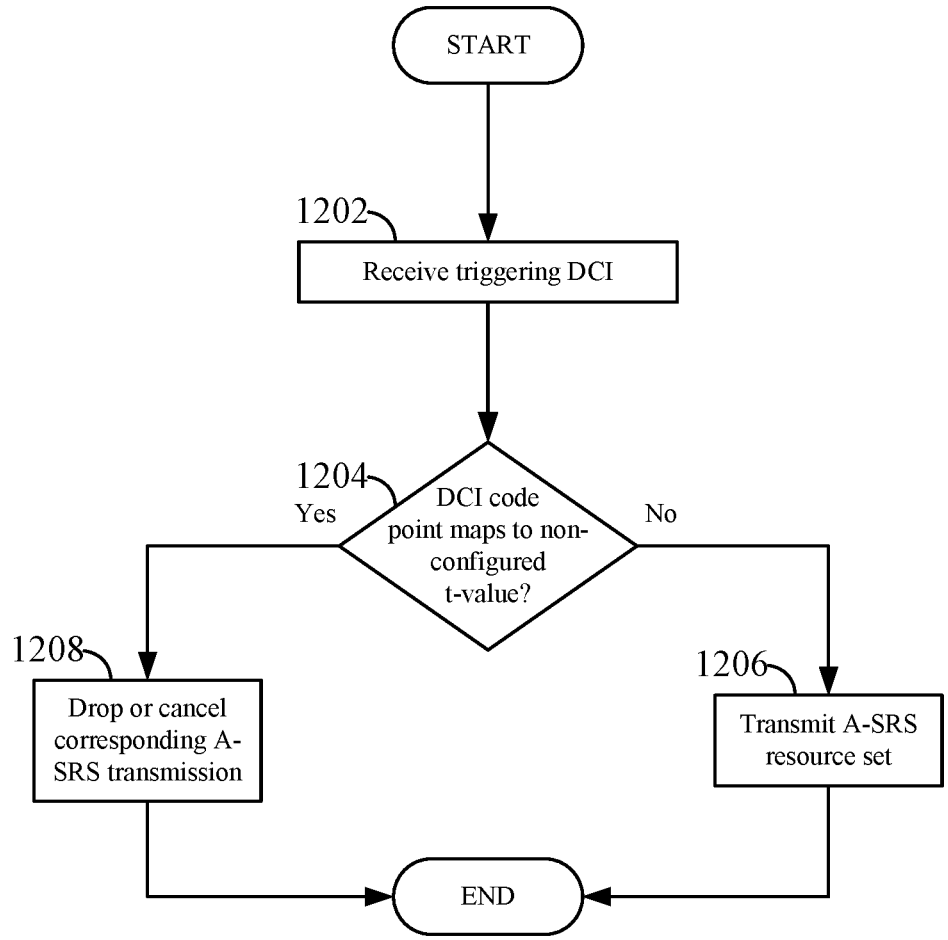
FIG. 12 is a flow chart illustrating an exemplary process for a user equipment (UE) carrying out an error handling procedure according to some aspects of this disclosure.
Figure 13:
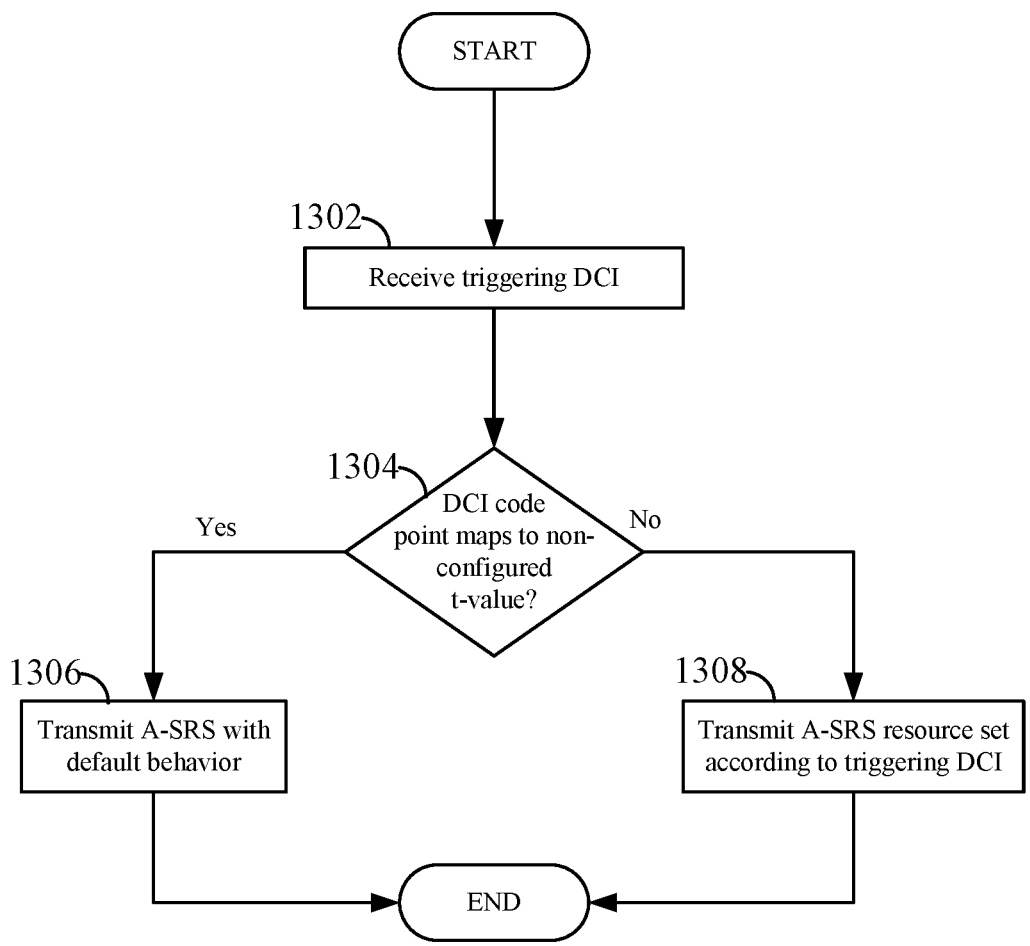
FIG. 13 is a flow chart illustrating an exemplary process for a UE carrying out default behavior in an A-SRS triggering procedure according to some aspects of this disclosure.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1, 2, and/or 9, and utilizing, for example, the processes and/or algorithms described herein in relation to FIGS. 12, 13, and/or 14.

Sounding Reference Signal

For a network to obtain a channel estimate of an UL channel, a UE can be configured to transmit a sounding reference signal (SRS). In 3GPP NR, an SRS resource can span up to four adjacent OFDM symbols (from among the last 6 symbols of a slot, and after the PUSCH in that slot), with up to four ports per SRS resource. In the frequency domain, an SRS resource may have a comb structure, being transmitted in every n-th subcarrier or tone, where n can be 2 or 4, for example.

An SRS resource set contains a set of SRS resources for SRS transmission by one UE. A given UE may be configured with one or with several SRS resource sets, and may transmit an SRS resource set periodically, semi-persistently, or aperiodically. Different SRS resource sets can be configured based on the use case: for example, for antenna switching, codebook-based, non-codebook-based, beam management, etc.

A network can trigger transmission of an aperiodic SRS resource set by transmitting a suitable DCI (e.g., a triggering DCI). For example, a triggering DCI may include an SRS request field to trigger aperiodic UE transmission of one or more selected SRS resource set(s). The triggering DCI may further include an SRS slot offset parameter to configure which slot the UE should use for transmission of its SRS resource set.

Figure 9:
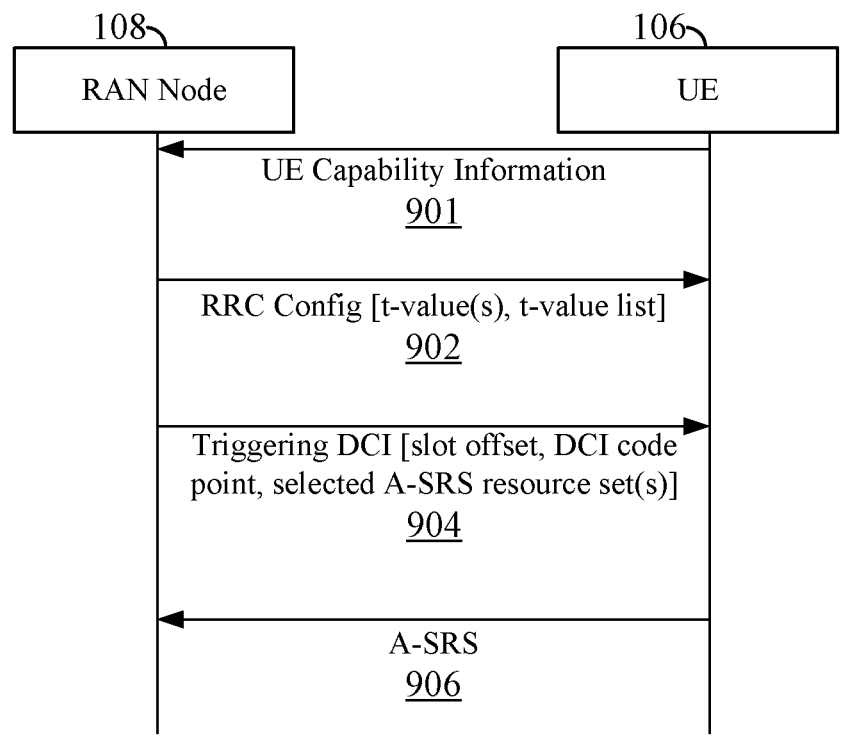
FIG. 9 is a call flow diagram illustrating an asynchronous sounding reference signal (A-SRS) triggering procedure according to some aspects of this disclosure.

Some examples of a wireless communication network may employ an enhanced aperiodic SRS (A-SRS) triggering procedure. With this enhanced A-SRS triggering procedure, as illustrated in FIG. 9, a UE may transmit UE capability information 901 indicating its capability of supporting an enhanced A-SRS triggering procedure as described in the present disclosure. When RRC configuration 902 sets up a radio bearer for a given bandwidth, based on the UE capability 901, the network may indicate its support of the enhanced A-SRS triggering procedure. For example, RRC configuration 902 may set up the A-SRS mechanism and configure one or more "t-values," or available slot offset values, for each of one or more A-SRS resource sets. Using this configuration, a RAN node 108 that triggers an A-SRS transmits a DCI (a triggering DCI 904) that, in addition to the legacy slot offset value, may further include a parameter (e.g., a DCI code point) that maps to a selected t-value. (If the RRC configuration 902 only configures one t-value for a given A-SRS resource set, then the triggering DCI 904 may omit this parameter and the UE may assume the sole configured t-value for that A-SRS resource set.)

TABLE 1

Example Mapping of DCI Code Points to t-values

| DCI code point | t-value |
| --- | --- |
| 00 | t0 = 0 |
| 01 | t1 = 1 |
| 10 | t2 = 2 |
| 11 | t3 = 3 |

Figure 10:
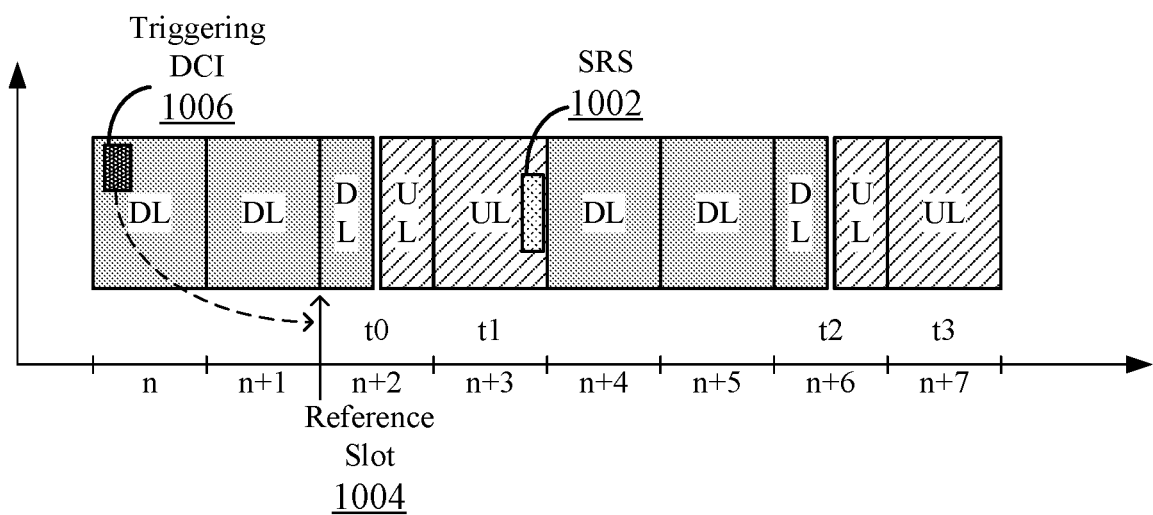
FIG. 10 is a schematic illustration showing the timing of an A-SRS triggering procedure on a TDD carrier according to some aspects of this disclosure.

The t-values, or available slot offset values, identify a slot for a UE to transmit the A-SRS 1002, as illustrated in the example shown in FIG. 10. For example, FIG. 10 illustrates a sequence of 8 slots labeled (n) to (n+7). In the illustrated example, slots n, n+1, n+4, and n+5 are DL slots; and slots n+3 and n+7 are UL slots. Slots n+2 and n+6 are special slots, with a DL portion and an UL portion separated by a guard period, as described above with reference to the TDD carrier 410 in FIG. 4.

As shown in FIG. 10, a RAN node 108 transmits a triggering DCI 1006 in slot n. The triggering DCI 1006 includes a legacy triggering offset and a t-value. Here, the legacy triggering offset may indicate an offset, given in a number of slots, between the slot carrying the triggering DCI 1006 and a reference slot 1004. For example, if the triggering DCI 904/1006 is carried in slot n, and the legacy triggering offset is a value of k, then the reference slot is slot n+k. In the example of FIG. 10, the legacy triggering offset is 2, so the reference slot 1004 is slot n+2.

For the enhanced A-SRS triggering procedure, the t-value indicated in the triggering DCI 904/1006 gives further information for a UE to utilize to identify an available slot for the SRS transmission. That is, in this example, a UE may transmit an A-SRS 1002 in the (t+1)-th available slot, counting starting from the reference slot 1004. In other words, the t-value represents an available slot offset relative to the reference slot 1004. In particular, the A-SRS 1002 is allocated to the (t+1)-th available slot counting starting from the reference slot, or slot n+k. Here, an available slot is a slot with suitable UL resources for the UE to use for SRS transmission. To be available, a given slot should include sufficient OFDM symbols configured for UL (or configured as flexible UL/DL) for the SRS resources in the corresponding SRS resource set. In the example shown in FIG. 10, DL slots n+4 and n+5 are not available slots, as they lack suitable UL resources for SRS transmission. Thus, assuming reference slot 1004, a t-value of t0 would identify the reference slot 1004 itself (slot n+2) for A-SRS transmission; a t-value of t1 would identify slot n+3; a t-value of t2 would identify slot n+6; and a t-value of t3 would identify slot n+7, for example.

In a further aspect of the enhanced A-SRS triggering procedure, a network can configure (e.g., employing RRC configuration of a radio bearer) a list of t-values for each of one or more SRS resource sets. This list or lists of t-values may each include up to four t-values at the time of writing, but within the present disclosure, such a list may include any suitable number of t-values. For example, a network may configure an A-SRS resource set 0 with a list of four t-values, while it may configure an A-SRS resource set 1 with a list of three t-values, etc.

TABLE 2

Example A-SRS Resource Sets

| DCI code point | Set 0 | Set 1 | Set 2 | Set 3 |
| --- | --- | --- | --- | --- |
| 00 | t0 | t0 | t0 | t0 |
| 01 | t1 | t1 | t1 | — |
| 10 | t2 | t2 | — | — |
| 11 | t3 | — | — | — |

Accordingly, a triggering DCI 904/1006 may further include an indication of one or more selected A-SRS resource sets, corresponding to the RRC-configured A-SRS resource sets. Referring to Table 2, consider a case where a gNB transmits a triggering DCI that triggers A-SRS resource sets 0 and 3. In this case, it might be assumed that the triggering DCI will indicate a DCI code point of 00 for A-SRS resource set 3, which maps to a t-value of t0. However, in some scenarios this might not be the case. In the example configuration of Table 2, the triggering DCI may instead indicate a DCI code point 11, for example, for that A-SRS resource set. In such a scenario, it is unclear what the UE behavior should be, and what the RAN node expectation of the UE behavior should be. Accordingly, some aspects of the present disclosure provide for UE behavior, and RAN node behavior, when a triggering DCI indicates a particular A-SRS resource set and a t-value or DCI code point that is not configured for the indicated A-SRS resource set.

In relation to the enhanced A-SRS triggering mechanism described above, a RAN node may rely on a UE providing capability signaling to inform the RAN node that the UE supports this feature. Similarly, a RAN node may indicate its own support of this feature to a UE through suitable RRC configuration. In some examples, RRC configuration of the available slot offset per A-SRS resource set (i.e., the t-values described above) itself may suffice to indicate RAN node support of the enhanced A-SRS triggering mechanism. However, in other examples, additional configuration may be desired. Accordingly, further aspects of the present disclosure provide capability signaling between a UE and RAN node to support the A-SRS triggering mechanisms described herein, and configuration signaling for supporting features.

Still further aspects of this disclosure provide supporting configuration, features, and signaling for A-SRS triggering procedures across BWPs and across CCs when operating in carrier aggregation.

gNB Restriction

According to some aspects of the present disclosure, a RAN node or scheduling entity 700 (e.g., a gNB) may be configured to reduce or eliminate the triggering of one or more A-SRS resource set(s) where the DCI code point maps to a non-configured t-value for the triggered A-SRS set(s). For example, a RAN node may be restricted to generate only triggering DCIs that have a DCI code point that maps to configured t-values for all triggered A-SRS resource sets. That is, if a RAN node generates a triggering DCI that triggers any number of one or more A-SRS resource sets, then that triggering DCI will not include any DCI code point that is not configured for all the one or more triggered A-SRS resource sets. In this way, different A-SRS resource sets could still be configured with different lists of t-values. For example, again referring to Table 2, if A-SRS resource set 0 and A-SRS resource set 2 are configured, then for a triggering DCI that triggers A-SRS resource sets 0 and 2, the DCI code point may be restricted to values of 00 or 01 within that triggering DCI. That is, even though A-SRS resource set 0 is configured for DCI code point 10 and 11, if a triggering DCI that triggers A-SRS resource set 0 also triggers A-SRS resource set 2, then the DCI code point corresponding to A-SRS resource set 0 in that triggering DCI will be restricted to values of 00 or 01.

FIG. 11 is a flow chart illustrating an exemplary process for a base station, scheduling entity, gNB, or RAN node to carry out an A-SRS triggering procedure in accordance with some aspects of the present disclosure. As described below, a particular implementation may omit some or all illustrated features and may not require some illustrated features to implement all embodiments. In some examples, the RAN node 700 illustrated in FIG. 7 may be configured to carry out the process of FIG. 11. In some examples, any suitable apparatus or means for carrying out the functions or algorithm described below may carry out the process of FIG. 11.

At block 1102 the RAN node 700 may generate a triggering DCI for triggering one or more selected A-SRS resource sets. Here, the RAN node 700 may select only those t-values that are configured for all the selected A-SRS resource sets of the triggering DCI. For example, a RAN node 700 may select one or more A-SRS resource sets and then select from a set of t-value configured for each of the selected A-SRS resource set(s). In another example, a RAN node 700 may select a t-value and then select one or more A-SRS resource set(s) for which the selected t-value is configured. At block 1104 the RAN node 700 may transmit (e.g., via a transceiver) the triggering DCI to a UE. And at block 1106 the RAN node 700 may receive (e.g., via a transceiver) an SRS from that UE based on the triggering DCI.

In some examples, such a configuration may be implemented by restricting the freedom of the RAN node 700 to configuring all A-SRS resource sets to have the same list size of t-values. In other words, with this restriction procedure, all A-SRS resource sets may have the same number of t-values, or the list size may be the same, across all configured/triggered A-SRS resource sets. Thus, RRC configuration message 902 in FIG. 9 may configure a plurality of A-SRS resource sets, each with the same number of available slot offset values.

With some of the RAN node restrictions discussed above in place, a UE may not expect to be triggered with multiple A-SRS resource sets where the indicated DCI code point(s) of one or more of the triggered A-SRS resource sets map to non-configured t-values. However, a further aspect of this disclosure provides for UE procedures if the UE is nonetheless triggered with an A-SRS resource set where the indicated DCI code point (or t-value) is not configured.

UE Error Handling

In a further aspect of the present disclosure, if an A-SRS resource set is triggered and the DCI code point maps to a non-configured t-value for that A-SRS resource set, then a UE may consider the scenario as an error case, and may drop or cancel the corresponding A-SRS transmission. For example, again using the example from Table 2, if a triggering DCI triggers A-SRS resource set 0 and A-SRS resource set 1, and indicates a DCI code point of 11, then a UE may transmit the A-SRS resource set 0 but may drop or cancel the A-SRS resource set 1.

FIG. 12 is a flow chart illustrating an exemplary process for a scheduled entity or UE to employ an error handling procedure in an A-SRS triggering procedure in accordance with some aspects of the present disclosure. As described below, a particular implementation may omit some or all illustrated features and may not require some illustrated features to implement all embodiments. In some examples, the scheduled entity or UE 800 illustrated in FIG. 8 may be configured to carry out the process of FIG. 12. In some examples, any suitable apparatus or means for carrying out the functions or algorithm described below may carry out the process of FIG. 12.

At block 1202, a UE 800 may receive (e.g., via a transceiver) a triggering DCI. As discussed above, a triggering DCI may include a slot offset value; a DCI code point that maps to a t-value; and a t-value list identifier that identifies one or more selected A-SRS resource set(s) from a list of A-SRS resource sets.

At block 1204, the UE 800 may determine whether the DCI code point in the triggering DCI maps to a non-configured t-value for the identified A-SRS resource set. If no, then the process may proceed to block 1206 and the UE 800 may transmit (e.g., via a transceiver) an A-SRS resource set according to the triggering DCI. However, if yes, then the process may proceed to block 1208. Here, because the DCI code point maps to a non-configured t-value, the UE 800 may drop or cancel the corresponding A-SRS transmission.

UE Default Behavior

In a still further aspect of this disclosure, if an A-SRS resource set is triggered and the DCI code point maps to a non-configured t-value, then the UE may employ a suitable default behavior that may differ from network expectations for the SRS transmission. For example, again using the example from Table 2, if a triggering DCI triggers A-SRS resource set 0 and A-SRS resource set 1, and indicates a DCI code point of 11, then the UE may transmit the A-SRS resource set 0 with the indicated t-value, but may transmit the A-SRS resource set 1 with a default behavior that may differ from that of the indicated t-value. Some examples of a suitable default behavior are provided below.

FIG. 13 is a flow chart illustrating an exemplary process for a UE to employ a default behavior in connection with an enhanced A-SRS triggering procedure in accordance with some aspects of the present disclosure. As described below, a particular implementation may omit some or all illustrated features and may not require some illustrated features to implement all embodiments. In some examples, the scheduled entity or UE 800 illustrated in FIG. 8 may be configured to carry out the process of FIG. 13. In some examples, any suitable apparatus or means for carrying out the functions or algorithm described below may carry out the process of FIG. 13.

At block 1302, a UE 800 may receive (e.g., via a transceiver) an A-SRS-triggering DCI. As discussed above, an A-SRS-triggering DCI may include an A-SRS request indicator for indicating one or more A-SRS resource sets; a slot offset value; a DCI code point that maps to a t-value; and a t-value list identifier that identifies one or more selected A-SRS resource set(s) from a list of A-SRS resource sets.

At block 1304, the UE 800 may determine whether the DCI code point in the triggering DCI maps to a non-configured t-value for the identified A-SRS resource set. If no, then the process may proceed to block 1308 and the UE 800 may transmit (e.g., via a transceiver) an A-SRS resource set according to the triggering DCI. However, if yes, then the process may proceed to block 1306. Here, because the DCI code point maps to a non-configured t-value, the UE 800 may carry out a corresponding A-SRS transmission utilizing a suitable default behavior.

For example, if an A-SRS resource set is triggered and the DCI code point maps to a non-configured t-value, a UE may transmit an A-SRS using a default t-value of '0.' Here, this default available slot offset value of 0 results in UE transmission of the A-SRS at the first available slot.

In another example, if an A-SRS resource set is triggered and the DCI code point maps to a non-configured t-value, a UE may transmit an A-SRS using a default t-value of the first configured t-value in the list, or the last configured t-value in the list.

In another example, if an A-SRS resource set is triggered and the DCI code point maps to a non-configured t-value, a UE may transmit an A-SRS using a default t-value of the maximum configured t-value in the list, or the minimum configured t-value in the list. For example, the UE may compare the t-values in the list with one another and identify the corresponding minimum or maximum value for use as a default t-value.

In another example, if an A-SRS resource set is triggered and the DCI code point maps to a non-configured t-value, a UE may transmit an A-SRS using a default t-value, where the default t-value is generated by truncating one or more bits from the DCI code point. For example, if a DCI code point is a 2-bit value, the UE may truncate the DCI code point to a 1-bit value. Here, the truncated bit may be the most significant bit, although this is not necessarily the case. In this case, a DCI code point with a binary value of 0b10 may be truncated such that the UE assumes a DCI code point of 0b00.

In another example, if an A-SRS resource set is triggered and the DCI code point maps to a non-configured t-value, a UE may transmit an A-SRS using a default behavior corresponding to legacy behavior (e.g., according to 3GPP release-16 specifications for NR). For example, as described above, the triggering DCI may include a slot offset value that identifies a reference slot from which the t-value is used for counting available slots to locate an SRS resource. However, release-16 legacy behavior lacks this enhanced A-SRS triggering procedure, and the slot offset value identifies the slot that carries the SRS resource. Thus, in this example, if an A-SRS resource set is triggered and the DCI code point maps to a non-configured t-value, a UE may default to legacy behavior and transmit an A-SRS at the reference slot (n+k), where the A-SRS triggering DCI is received at slot n, and k is the slot offset.

In another example, if an A-SRS resource set is triggered wherein the A-SRS resource set has only a single t-value, and the DCI code point maps to a non-configured t-value, a UE may transmit an A-SRS using a default behavior by ignoring the DCI code point and assuming that the t-value is that of the single configured t-value. That is, the UE may transmit an A-SRS while assuming that the available slot offset value is that of a configured available slot offset value (e.g., that of the single configured t-value).

Indication of the Bit Width of the DCI Code Point Bitfield

As discussed above, for a given BWP, carrier, component carrier, set of carriers, set of component carriers, or cell(s) (referred to collectively below as a given bandwidth), a UE may be RRC-configured for a plurality of different A-SRS resource sets. The network may configure, for each A-SRS resource set for a given bandwidth, a list of t-values. Accordingly, a triggering DCI that triggers an A-SRS resource set for a given bandwidth should have a DCI code point bitfield that has sufficient bit width to carry any potential DCI code point. In a further aspect of this disclosure, a RAN node may explicitly signal to a UE the bit width of the DCI code point bitfield. That is, the DCI code point bitfield of a triggering DCI may be configurable per given bandwidth, and may have a different bit width in different triggering DCIs. As an illustrative example, the DCI code point bitfield of a given triggering DCI may have 0 bits, 1 bit, or 2 bits, although other examples can employ any suitable bit width.

In some examples, a RAN node may provide a UE with an explicit indication of the bit width of the DCI code point bitfield for a given bandwidth. For example, a RAN node may provide a suitable RRC configuration parameter for each given bandwidth, explicitly indicating the bit width of the DCI code point bitfield for triggering DCIs corresponding to that given bandwidth. In another example, the bit width of the DCI bitfield that carries the DCI code point may be implicitly derived without explicit signaling of a bit width value. For example, a UE and RAN node may configure the bit width of the DCI code point bitfield for a given bandwidth based on the configured A-SRS resource set for that given bandwidth that includes the largest (i.e. maximum) number of available slot offset values (t-values). For example, based on the above example configuration in Table 2, the DCI bitfield may have a bit width of 2-bits, because the A-SRS resource set with the largest number of t-values is set 0, which includes 4 values (i.e., $\log_2$ (4 values)=(2 bits)).

Indication of the Enhanced A-SRS Triggering Feature

In a further aspect of the present disclosure, a RAN node may signal to a UE that the RAN node supports the enhanced A-SRS triggering procedures described herein. Any suitable signaling mechanism may be employed to signal RAN node support of this procedure. As one example, a UE may imply that a RAN node supports the enhanced A-SRS triggering procedures described herein when the RAN node provides that UE with RRC configuration of the bit width of a DCI code point bitfield (i.e., the DCI code point that maps to a t-value as described herein). That is, if a RAN node provides RRC signaling that explicitly configures the bit width of the DCI code point bitfield, the UE may imply that the RAN node supports enhanced A-SRS triggering procedures.

In another example, a UE may imply that a RAN node supports the enhanced A-SRS triggering procedures described herein when the RAN node provides that UE with RRC configuration for one or more t-values for one or more A-SRS resource sets. That is, if a RAN node provides RRC signaling that configures a DCI code point (which maps to a t-value) of at least one A-SRS resource set, then the UE may imply that the RAN node supports enhanced A-SRS triggering procedures.

In a case where a UE employs this condition, the UE may expect that all configured A-SRS resource sets will be configured with at least one t-value to imply that the RAN node supports enhanced A-SRS triggering. In other words, if any configured A-SRS resource set is not configured with at least one t-value, the UE may fall back to legacy A-SRS triggering, as described above. However, in another example, where a UE employs this condition, the UE may expect that at least one A-SRS resource set will be configured with at least one t-value to imply that the RAN node supports enhanced A-SRS triggering. In other words, if any configured A-SRS resource set is configured with at least one t-value, the UE may utilize enhanced A-SRS triggering procedures, as described above. In this example, it may occur that one or more configured A-SRS resource sets are not configured with at least one t-value. In this scenario, according to a further aspect of this disclosure, in the event that a triggering DCI triggers an A-SRS resource set that does not have a configured t-value, the UE may assume a default t-value (e.g., t=0) for those A-SRS resource sets that are not configured with at least one t-value. For example, in this case the UE may transmit an A-SRS assuming a default available slot offset value of t=0.

In still another example, a UE may rely on a combination of both of the above to imply that a RAN node supports enhanced A-SRS triggering procedures. That is, a UE may imply that a RAN node supports the enhanced A-SRS triggering procedures described herein when the RAN node provides that UE both with RRC configuration for one or more t-values for one or more A-SRS resource sets, and with RRC configuration of the bit width of a DCI code point bitfield (which maps to t-values).

Figure 14:
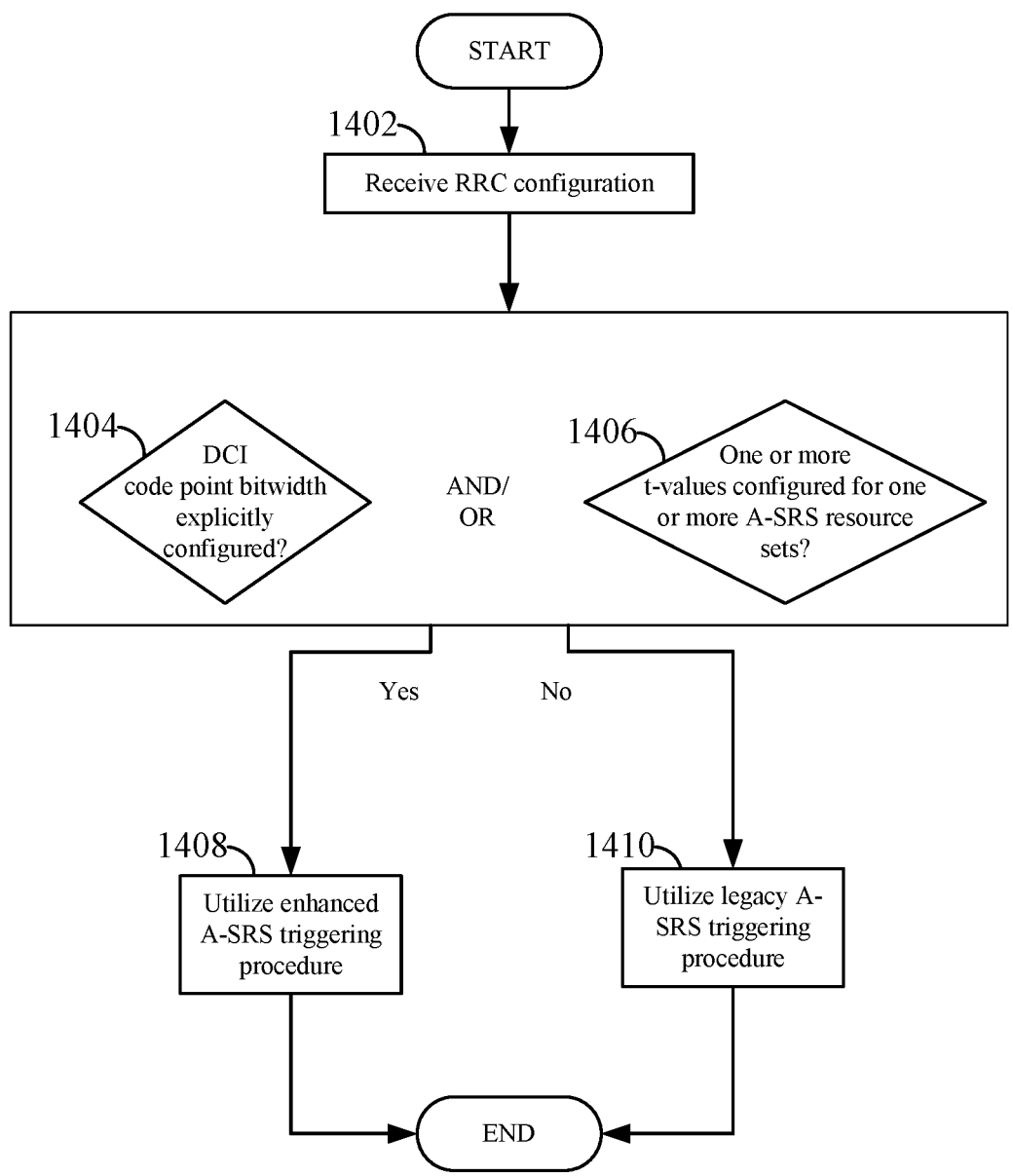
FIG. 14 is a flow chart illustrating an exemplary process for a UE detecting whether a base station is configured for an enhanced A-SRS triggering procedure according to some aspects of this disclosure.

FIG. 14 is a flow chart illustrating an exemplary process for a UE to determine that a RAN node supports an enhanced A-SRS triggering procedure in accordance with some aspects of the present disclosure. As described below, a particular implementation may omit some or all illustrated features and may not require some illustrated features to implement all embodiments. In some examples, the scheduled entity or UE 800 illustrated in FIG. 8 may be configured to carry out the process of FIG. 14. In some examples, any suitable apparatus or means for carrying out the functions or algorithm described below may carry out the process of FIG. 14.

At block 1402, a UE 800 may receive RRC configuration signaling from a RAN node, e.g., for configuring a radio bearer for a given bandwidth (e.g., for a given BWP, carrier, component carrier, cell, etc.). At blocks 1404 and/or 1406, the UE 800 may determine whether the configured bandwidth supports an enhanced A-SRS triggering procedure. For example, at block 1404, the UE 800 may determine whether the RRC configuration explicitly configured a bit width for a DCI code point bitfield. Additionally or alternatively, at block 1406, the UE may determine whether the configured bandwidth supports enhanced A-SRS triggering by determining whether the RRC configuration configured at least one t-value for one or more A-SRS resource sets. That is, a radio bearer configuration message (e.g., RRC configuration signaling) can indicate support for the enhanced A-SRS triggering procedure by configuring the available slot offset value for at least one of the one or more configured A-SRS resource sets.

If yes, then at block 1408 the UE 800 may utilize the enhanced A-SRS triggering procedure described herein. That is, a UE 800 may employ a DCI code point bitfield for determining an available slot for transmission of one or more A-SRS resource sets. If no, then at block 1410 the UE 800 may utilize legacy A-SRS triggering procedures as described in release-16 or earlier specifications of 3GPP NR. For example, the UE 800 may determine an available slot for transmission of one or more A-SRS resource sets based on a legacy slot offset relative to a triggering DCI, without further determining an available slot offset based on a t-value as described herein.

A-SRS Triggering Across BWPs and CCs

In various examples, a RAN node may initiate BWP switching for a UE, which switches the UE from a first BWP to a second BWP. In some cases, even if the RAN node indicated support of enhanced A-SRS triggering as described herein above, a BWP switching procedure may not indicate to the UE whether the second BWP also supports enhanced A-SRS triggering. Thus, a further aspect of this disclosure provides that a UE may expect that such BWP switching would not change the A-SRS triggering mechanism for that carrier (or component carrier or cell). That is, a UE may expect that all A-SRS resource sets across the different BWPs of a given carrier, component carrier, or cell will have configured t-values, or will have an associated RRC configuration parameter that indicates support of the enhanced A-SRS triggering procedure described herein. For example, a UE may receive a first A-SRS triggering DCI corresponding to a first BWP, including an indication of support for an enhanced A-SRS triggering mechanism. The UE may subsequently switch from the first BWP to a second BWP. Subsequently, the UE may receive a second A-SRS-triggering DCI corresponding to the second BWP. Here, the UE may expect that the second A-SRS-triggering DCI includes an indication of support for the enhanced A-SRS triggering mechanism.

In further examples, a RAN node (or set of RAN nodes) utilizing carrier aggregation may indicate support for enhanced A-SRS triggering as described herein for only a subset of the aggregated component carriers (e.g., for one component carrier). Without an indication of support (or lack of support) for each component carrier, it may be unclear how a UE should behave across component carriers in carrier aggregation. Thus, according to a further aspect of this disclosure, a UE may assume that all component carriers in carrier aggregation will have the same A-SRS triggering procedure as one another. Accordingly, if a UE determines that a RAN node supports enhanced A-SRS triggering for a first component carrier, the UE may assume that the RAN node supports enhanced A-SRS triggering for one or more other component carriers in carrier aggregation with the first component carrier.

In another aspect of this disclosure, a UE may assume that different component carriers in carrier aggregation may have different A-SRS triggering procedures from one another. Accordingly, such a UE may independently determine whether a RAN node supports enhanced A-SRS triggering for each component carrier of at least two component carriers in carrier aggregation.

Further Examples Having a Variety of Features

Example 1: A method operable at a scheduling entity, the method comprising: transmitting an aperiodic sounding reference signal (A-SRS)-triggering downlink control information (DCI) comprising: an A-SRS request indicator for indicating one or more A-SRS resource sets; and a DCI code point for indicating an available slot; and receiving an A-SRS corresponding to the A-SRS-triggering DCI, wherein the DCI code point maps to an available slot offset value that is configured for each A-SRS resource set of the one or more A-SRS resource sets.

Example 2: The method of example 1, wherein the scheduling entity is prohibited from selecting the DCI code point that maps to an available slot offset value that is unconfigured for each A-SRS resource set of the one or more A-SRS resource sets.

Example 3: The method of any of examples 1-2, further comprising: selecting a set of one or more DCI code points, the set including the DCI code point for indicating the available slot; and transmitting a radio bearer configuration message for configuring a plurality of A-SRS resource sets, including the one or more A-SRS resource sets, for a bandwidth, and for configuring each of the DCI code points in the set of one or more DCI code points for each of the A-SRS resource sets in the plurality of A-SRS resource sets.

Example 4: A method operable at a scheduled entity, the method comprising: receiving an aperiodic sounding reference signal (A-SRS)-triggering downlink control information (DCI) comprising: an A-SRS request indicator for indicating one or more A-SRS resource sets; and a DCI code point for indicating an available slot; and transmitting an A-SRS corresponding to a triggered A-SRS resource set indicated in the A-SRS request indicator when the DCI code point maps to an available slot offset value that is configured for the indicated A-SRS resource set; and forgoing to transmit an A-SRS corresponding to at least one triggered A-SRS resource set indicated in the A-SRS request indicator when the DCI code point maps to an available slot offset value that is not configured for the at least one triggered A-SRS resource set.

Example 5: The method of example 4, wherein UE does not expect to be triggered with multiple A-SRS resource sets where the indicated DCI code point(s) of one or more of the triggered A-SRS resource sets map to an available slot offset value that is not configured for the multiple triggered A-SRS resource sets.

Example 6: A method operable at a scheduled entity, the method comprising: receiving an aperiodic sounding reference signal (A-SRS)-triggering downlink control information (DCI) comprising: an A-SRS request indicator for indicating one or more A-SRS resource sets; and a DCI code point for indicating an available slot; and transmitting an A-SRS corresponding to a triggered A-SRS resource set indicated in the A-SRS request indicator when the DCI code point maps to an available slot offset value that is configured for the indicated A-SRS resource set; and transmitting an A-SRS corresponding to at least one triggered A-SRS resource set indicated in the A-SRS request indicator utilizing a default behavior when the DCI code point maps to an available slot offset value that is not configured for the at least one triggered A-SRS resource set.

Example 7: The method of example 6, wherein UE does not expect to be triggered with multiple A-SRS resource sets where the indicated DCI code point(s) of one or more of the triggered A-SRS resource sets map to an available slot offset value that is not configured for the multiple triggered A-SRS resource sets.

Example 8: The method of any of examples 6-7, wherein the default behavior comprises one or more of: transmitting an A-SRS using a default t-value of '0'; transmitting an A-SRS using a default t-value of the first configured t-value in the list, or the last configured t-value in the list; transmitting an A-SRS using a default t-value of the maximum configured t-value in the list, or the minimum configured t-value in the list; transmitting an A-SRS using a default t-value, where the default t-value is generated by truncating one or more bits from the DCI code point; transmitting an A-SRS using a default behavior corresponding to legacy behavior (e.g., according to 3GPP release-16 specifications for NR; or transmitting an A-SRS using a default behavior by ignoring the DCI code point and assuming that the t-value is that of the single configured t-value.

Example 9: A method of wireless communication operable at a scheduled entity, the method comprising: transmitting a capability information signal indicating a capability to support an aperiodic sounding reference signal (A-SRS) triggering procedure based on a triggering downlink control information (DCI) that includes an available slot offset value; and receiving a radio bearer configuration message for configuring a bandwidth, the radio bearer configuration message comprising an indication of support of the A-SRS triggering procedure based on the triggering DCI that includes the available slot offset value.

Example 10: The method of example 9, wherein the radio bearer configuration message comprises information for configuring one or more A-SRS resource sets, and wherein the radio bearer configuration message indicates the support for the A-SRS triggering procedure by configuring the available slot offset value for at least one of the one or more configured A-SRS resource set(s).

Example 11: The method of any of examples 9-10, further comprising utilizing the available slot offset value to identify a slot for carrying the transmitted A-SRS when the radio bearer configuration message indicates support for an A-SRS triggering procedure based on the available slot offset.

Example 12: The method of example 9, wherein the radio bearer configuration message indicates the support for the A-SRS triggering procedure by explicitly configuring a bit width parameter for the DCI code point bitfield.

Example 13: The method of example 9, further comprising determining for a bandwidth, based on a number of available slot offset values configured for any of one or more configured A-SRS resource sets for the bandwidth, a bit width of a bitfield for carrying the available slot offset value on the triggering DCI. (log 2(max_num_t_values))

Example 14: The method of any of examples 9-13, wherein, when one or more configured A-SRS resource sets are not configured with an available slot offset value, the UE assumes a default available slot offset value of t=0 when the one or more configured A-SRS resource sets are triggered.

Example 15: The method of example 9, wherein, when one or more configured A-SRS resource sets are not configured with an available slot offset value, the UE assumes a fixed slot offset for the triggered A-SRS resource set.

Example 16: The method of example 9, wherein the bandwidth comprises a plurality of carriers in carrier aggregation, the method further comprising: receiving a first A-SRS-triggering DCI on a first carrier of the plurality of carriers, the first DCI comprising a first A-SRS request indicator; receiving a second A-SRS-triggering DCI on a second carrier of the plurality of carriers, the second DCI comprising a second A-SRS request indicator; transmitting a first A-SRS corresponding to a first triggered A-SRS resource set indicated in the first A-SRS request indicator when a first DCI code point in the first A-SRS-triggering DCI maps to a first available slot offset value that is configured for the first triggered A-SRS resource set; and transmitting a second A-SRS corresponding to a second triggered A-SRS resource set indicated in the second A-SRS request indicator when a second DCI code point in the second A-SRS-triggering DCI maps to a second available slot offset value that is configured for the second triggered A-SRS resource set.

Example 17: The method of example 9, wherein the bandwidth comprises a carrier comprising a plurality of bandwidth parts (BWPs), the method further comprising: receiving a first A-SRS-triggering DCI corresponding to a first BWP of the plurality of BWPs, the first DCI comprising a first A-SRS request indicator; switching from the first BWP to a second BWP; and receiving a second A-SRS-triggering DCI corresponding to a second BWP of the plurality of BWPs, the second DCI comprising a second A-SRS request indicator.

Example 18: The method of any of examples 9-17, further comprising: transmitting an A-SRS corresponding to a second triggered A-SRS resource set indicated in a second A-SRS request indicator when a DCI code point in the second A-SRS-triggering DCI maps to an available slot offset value that is configured for the second indicated A-SRS resource set.

Example 19: The method of any of examples 9-17, further comprising: transmitting an A-SRS corresponding to a second triggered A-SRS resource set indicated in a second A-SRS request indicator when a DCI code point in the first A-SRS-triggering DCI maps to an available slot offset value that is configured for a first indicated A-SRS resource set in the first DCI.

Example 20: The method of example 9, wherein the A-SRS-triggering DCI is received on a first carrier, the method further comprising: receiving, on a second carrier in carrier aggregation with the first carrier, a second A-SRS-triggering DCI; and transmitting, on the second carrier, a second A-SRS corresponding to a second indicated A-SRS resource set indicated in a second A-SRS resource set indicator in the second A-SRS-triggering DCI when a second DCI code point in the second A-SRS-triggering DCI maps to a second available slot offset value that is configured for the second indicated A-SRS resource set.

Example 21: An apparatus for wireless communication, comprising: means for transmitting an aperiodic sounding reference signal (A-SRS)-triggering downlink control information (DCI) comprising: an A-SRS request indicator for indicating one or more A-SRS resource sets; and a DCI code point for indicating an available slot; and means for receiving an A-SRS corresponding to the A-SRS-triggering DCI, wherein the DCI code point maps to an available slot offset value that is configured for each A-SRS resource set of the one or more A-SRS resource sets.

Example 22: The apparatus of example 21, further comprising means for performing the operations of one or more of examples 2-3.

Example 23: An apparatus for wireless communication, comprising: means for receiving an aperiodic sounding reference signal (A-SRS)-triggering downlink control information (DCI) comprising: an A-SRS request indicator for indicating one or more A-SRS resource sets; and a DCI code point for indicating an available slot; and means for transmitting an A-SRS corresponding to a triggered A-SRS resource set indicated in the A-SRS request indicator when the DCI code point maps to an available slot offset value that is configured for the indicated A-SRS resource set; and means for forgoing to transmit an A-SRS corresponding to at least one triggered A-SRS resource set indicated in the A-SRS request indicator when the DCI code point maps to an available slot offset value that is not configured for the at least one triggered A-SRS resource set.

Example 24: An apparatus for wireless communication, comprising: means for receiving an aperiodic sounding reference signal (A-SRS)-triggering downlink control information (DCI) comprising: an A-SRS request indicator for indicating one or more A-SRS resource sets; and a DCI code point for indicating an available slot; and means for transmitting an A-SRS corresponding to a triggered A-SRS resource set indicated in the A-SRS request indicator when the DCI code point maps to an available slot offset value that is configured for the indicated A-SRS resource set; and means for transmitting an A-SRS corresponding to at least one triggered A-SRS resource set indicated in the A-SRS request indicator utilizing a default behavior when the DCI code point maps to an available slot offset value that is not configured for the at least one triggered A-SRS resource set.

Example 25: An apparatus for wireless communication, comprising: means for transmitting a capability information signal indicating a capability to support an aperiodic sounding reference signal (A-SRS) triggering procedure based on a triggering downlink control information (DCI) that includes an available slot offset value; and means for receiving a radio bearer configuration message for configuring a bandwidth, the radio bearer configuration message comprising an indication of support of the A-SRS triggering procedure based on the triggering DCI that includes the available slot offset value.

Example 26: The apparatus of any of examples 23-25, further comprising means for performing the operations of any one or more of examples 5, 7, 8, and 10-20.

Example 27: A non-transitory computer-readable medium storing computer-executable code, comprising code for causing a computer to: transmit an aperiodic sounding reference signal (A-SRS)-triggering downlink control information (DCI) comprising: an A-SRS request indicator for indicating one or more A-SRS resource sets; and a DCI code point for indicating an available slot; and receive an A-SRS corresponding to the A-SRS-triggering DCI, wherein the DCI code point maps to an available slot offset value that is configured for each A-SRS resource set of the one or more A-SRS resource sets.

Example 28: The non-transitory computer-readable medium of example 27, further comprising code for causing a computer to perform the operations of one or more of examples 2-3.

Example 29: A non-transitory computer-readable medium storing computer-executable code, comprising code for causing a computer to: receive an aperiodic sounding reference signal (A-SRS)-triggering downlink control information (DCI) comprising:
an A-SRS request indicator for indicating one or more A-SRS resource sets; and a DCI code point for indicating an available slot; and transmit an A-SRS corresponding to a triggered A-SRS resource set indicated in the A-SRS request indicator when the DCI code point maps to an available slot offset value that is configured for the indicated A-SRS resource set; and forgo to transmit an A-SRS corresponding to at least one triggered A-SRS resource set indicated in the A-SRS request indicator when the DCI code point maps to an available slot offset value that is not configured for the at least one triggered A-SRS resource set.

Example 30: A non-transitory computer-readable medium storing computer-executable code, comprising code for causing a computer to: receive an aperiodic sounding reference signal (A-SRS)-triggering downlink control information (DCI) comprising: an A-SRS request indicator for indicating one or more A-SRS resource sets; and a DCI code point for indicating an available slot; and transmit an A-SRS corresponding to a triggered A-SRS resource set indicated in the A-SRS request indicator when the DCI code point maps to an available slot offset value that is configured for the indicated A-SRS resource set; and transmit an A-SRS corresponding to at least one triggered A-SRS resource set indicated in the A-SRS request indicator utilizing a default behavior when the DCI code point maps to an available slot offset value that is not configured for the at least one triggered A-SRS resource set.

Example 31: A non-transitory computer-readable medium storing computer-executable code, comprising code for causing a computer to: transmit a capability information signal indicating a capability to support an aperiodic sounding reference signal (A-SRS) triggering procedure based on a triggering downlink control information (DCI) that includes an available slot offset value; and receive a radio bearer configuration message for configuring a bandwidth, the radio bearer configuration message comprising an indication of support of the A-SRS triggering procedure based on the triggering DCI that includes the available slot offset value.

Example 32: The non-transitory computer-readable medium of any of examples 27-31, further comprising code for causing a computer to perform the operations of any one or more of examples 5, 7, 8, and 10-20.

Example 33: An apparatus for wireless communication, comprising: a processor; a transceiver communicatively coupled to the processor; and a memory communicatively coupled to the processor, wherein the processor and the memory are configured to transmit an aperiodic sounding reference signal (A-SRS)-triggering downlink control information (DCI) comprising: an A-SRS request indicator for indicating one or more A-SRS resource sets; and a DCI code point for indicating an available slot; and receive an A-SRS corresponding to the A-SRS-triggering DCI, wherein the DCI code point maps to an available slot offset value that is configured for each A-SRS resource set of the one or more A-SRS resource sets.

Example 34: The apparatus of example 33, wherein the processor is further configured to perform the operations of one or more of examples 2-3.

Example 35: An apparatus for wireless communication, comprising: a processor; a transceiver communicatively coupled to the processor; and a memory communicatively coupled to the processor, wherein the processor and the memory are configured to receive an aperiodic sounding reference signal (A-SRS)-triggering downlink control information (DCI) comprising: an A-SRS request indicator for indicating one or more A-SRS resource sets; and a DCI code point for indicating an available slot; to transmit an A-SRS corresponding to a triggered A-SRS resource set indicated in the A-SRS request indicator when the DCI code point maps to an available slot offset value that is configured for the indicated A-SRS resource set; and to forgo to transmit an A-SRS corresponding to at least one triggered A-SRS resource set indicated in the A-SRS request indicator when the DCI code point maps to an available slot offset value that is not configured for the at least one triggered A-SRS resource set.

Example 36: An apparatus for wireless communication, comprising: a processor; a transceiver communicatively coupled to the processor; and a memory communicatively coupled to the processor, wherein the processor and the memory are configured to receive an aperiodic sounding reference signal (A-SRS)-triggering downlink control information (DCI) comprising: an A-SRS request indicator for indicating one or more A-SRS resource sets; and a DCI code point for indicating an available slot; to transmit an A-SRS corresponding to a triggered A-SRS resource set indicated in the A-SRS request indicator when the DCI code point maps to an available slot offset value that is configured for the indicated A-SRS resource set; and to transmit an A-SRS corresponding to at least one triggered A-SRS resource set indicated in the A-SRS request indicator utilizing a default behavior when the DCI code point maps to an available slot offset value that is not configured for the at least one triggered A-SRS resource set.

Example 37: An apparatus for wireless communication, comprising: a processor; a transceiver communicatively coupled to the processor; and a memory communicatively coupled to the processor, wherein the processor and the memory are configured to transmit a capability information signal indicating a capability to support an aperiodic sounding reference signal (A-SRS) triggering procedure based on a triggering downlink control information (DCI) that includes an available slot offset value; and to receive a radio bearer configuration message for configuring a bandwidth, the radio bearer configuration message comprising an indication of support of the A-SRS triggering procedure based on the triggering DCI that includes the available slot offset value.

Example 38: The apparatus of any of examples 33-37, wherein the processor is further configured to perform the operations of any one or more of examples 5, 7, 8, and 10-20.

Example 39: An apparatus for wireless communication, comprising: a memory; and a processor coupled to the memory and configured to: transmit an aperiodic sounding reference signal (A-SRS)-triggering downlink control information (DCI) comprising: an A-SRS request indicator for indicating a plurality of A-SRS resource sets; and a DCI code point for indicating an available slot; and receive an A-SRS corresponding to the A-SRS-triggering DCI, wherein the DCI code point maps to an available slot offset value that is configured for at least one A-SRS resource set of the plurality of A-SRS resource sets.

Example 40: The apparatus of example 39, wherein each A-SRS resource set of the plurality of A-SRS resource sets has a same number of available slot offset values.

Example 41: The apparatus of one of examples 1-2, wherein the processor is further configured to: select a set of one or more DCI code points, the set including the DCI code point for indicating the available slot; and to transmit a radio bearer configuration message for configuring the plurality of A-SRS resource sets, for a bandwidth, and for configuring each DCI code point in the set of one or more DCI code points for each A-SRS resource set in the plurality of A-SRS resource sets.

Example 42: An apparatus for wireless communication, comprising: a memory; and a processor coupled to the memory and configured to: receive an aperiodic sounding reference signal (A-SRS)-triggering downlink control information (DCI) comprising: an A-SRS request indicator for indicating one or more A-SRS resource sets; and a DCI code point for indicating an available slot; and to transmit a first A-SRS corresponding to a triggered A-SRS resource set indicated in the A-SRS request indicator when the DCI code point maps to an available slot offset value that is configured for the one or more A-SRS resource sets; and to transmit a second A-SRS corresponding to a triggered A-SRS resource set indicated in the A-SRS request indicator utilizing a default behavior when the DCI code point maps to an available slot offset value that is not configured for the triggered A-SRS resource set.

Example 43: The apparatus of example 42, wherein the default behavior comprises one or more of: transmitting the second A-SRS using an available slot offset value of '0'; or transmitting the second A-SRS using a default behavior by ignoring the DCI code point and assuming that the available slot offset value is that of a configured available slot offset value.

Example 44: An apparatus for wireless communication, comprising: a memory; and a processor coupled to the memory and configured to: transmit a capability information signal indicating a capability to support an aperiodic sounding reference signal (A-SRS) triggering procedure based on a triggering downlink control information (DCI) that includes an available slot offset value; and to receive a radio bearer configuration message for configuring a bandwidth, the radio bearer configuration message comprising an indication of support of the A-SRS triggering procedure based on the triggering DCI that includes the available slot offset value.

Example 45: The apparatus of example 44, wherein the radio bearer configuration message comprises information for configuring one or more A-SRS resource sets, and wherein the radio bearer configuration message indicates the support for the A-SRS triggering procedure by configuring the available slot offset value for at least one of the one or more configured A-SRS resource set(s).

Example 46: The apparatus of one of examples 44-45, wherein the processor is further configured to utilize the available slot offset value to identify a slot for carrying the transmitted A-SRS when the radio bearer configuration message indicates support for an A-SRS triggering procedure based on the available slot offset.

Example 47: The apparatus of any one of examples 44-46, wherein the processor is further configured to determine for a bandwidth, based on a maximum number of available slot offset values configured for any of one or more configured A-SRS resource sets for the bandwidth, a bit width of a bitfield for carrying the available slot offset value on the triggering DCI.

Example 48: The apparatus of any one of examples 44-47, wherein when one or more configured A-SRS resource sets are not configured with an available slot offset value, and when the one or more configured A-SRS resource sets are triggered, the processor is further configured to transmit an A-SRS utilizing a default available slot offset value of t=0.

Example 49: The apparatus of any one of examples 44-48, wherein the bandwidth comprises a carrier comprising a plurality of bandwidth parts (BWPs), the processor being further configured to: receive a first A-SRS-triggering DCI corresponding to a first BWP of the plurality of BWPs, the first DCI comprising a first A-SRS request indicator; to switch from the first BWP to a second BWP of the plurality of BWPs; and to receive a second A-SRS-triggering DCI corresponding to the second BWP, the second DCI comprising a second A-SRS request indicator.

Example 50: The apparatus of example 49, wherein the first A-SRS-triggering DCI comprises a first available slot offset value having a first bit width, and wherein the second A-SRS-triggering DCI comprises a second available slot offset value having the first bit width.

Example 51: The apparatus of example 48, wherein the processor is further configured to: transmit an A-SRS corresponding to a second triggered A-SRS resource set indicated in the second A-SRS-triggering DCI when a DCI code point in the second A-SRS-triggering DCI maps to an available slot offset value that is configured for the second indicated A-SRS resource set.

Example 52: The apparatus of example 48, wherein the processor is further configured to: transmit an A-SRS corresponding to a second triggered A-SRS resource set indicated in the second A-SRS-triggering DCI when a DCI code point in the first A-SRS-triggering DCI maps to an available slot offset value that is configured for a first indicated A-SRS resource set in the first DCI.

Example 53: A method of wireless communication operable at a scheduled entity, the method comprising: transmitting a capability information signal indicating a capability to support an aperiodic sounding reference signal (A-SRS) triggering procedure based on a triggering downlink control information (DCI) that includes an available slot offset value; and receiving a radio bearer configuration message for configuring a bandwidth, the radio bearer configuration message comprising an indication of support of the A-SRS triggering procedure based on the triggering DCI that includes the available slot offset value.

Example 54: The method of example 53, wherein the radio bearer configuration message comprises information for configuring one or more A-SRS resource sets, and wherein the radio bearer configuration message indicates the support for the A-SRS triggering procedure by configuring the available slot offset value for at least one of the one or more configured A-SRS resource set(s).

Example 55: The method of one of examples 53-54, wherein the processor is further configured to utilize the available slot offset value to identify a slot for carrying the transmitted A-SRS when the radio bearer configuration message indicates support for an A-SRS triggering procedure based on the available slot offset.

Example 56: The method of one of examples 53-55, further comprising determining for a bandwidth, based on a maximum number of available slot offset values configured for any of one or more configured A-SRS resource sets for the bandwidth, a bit width of a bitfield for carrying the available slot offset value on the triggering DCI.

Example 57: The method of any one of examples 53-56, wherein: when one or more configured A-SRS resource sets are not configured with an available slot offset value, and when the one or more configured A-SRS resource sets are triggered, the method further comprises transmitting an A-SRS utilizing a default available slot offset value of t=0.

Example 58: The method of any one of examples 53-57, wherein the bandwidth comprises a carrier comprising a plurality of bandwidth parts (BWPs), the method further comprising: receiving a first A-SRS-triggering DCI corresponding to a first BWP of the plurality of BWPs, the first DCI comprising a first A-SRS request indicator; switching from the first BWP to a second BWP of the plurality of BWPs; and receiving a second A-SRS-triggering DCI corresponding to the second BWP, the second DCI comprising a second A-SRS request indicator.

Example 59: The method of example 58, wherein the first A-SRS-triggering DCI comprises a first available slot offset value having a first bit width, and wherein the second A-SRS-triggering DCI comprises a second available slot offset value having the first bit width Example 60: The method of example 58, further comprising: transmitting an A-SRS corresponding to a second triggered A-SRS resource set indicated in the second A-SRS-triggering DCI when a DCI code point in the second A-SRS-triggering DCI maps to an available slot offset value that is configured for the second indicated A-SRS resource set.

Example 61: The method of example 58, further comprising: transmitting an A-SRS corresponding to a second triggered A-SRS resource set indicated in the second A-SRS-triggering DCI when a DCI code point in the first A-SRS-triggering DCI maps to an available slot offset value that is configured for a first indicated A-SRS resource set in the first DCI.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

Applicant provides this description to enable any person skilled in the art to practice the various aspects described herein. Those skilled in the art will readily recognize various modifications to these aspects and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of a list of" items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
one or more memories; and
one or more processors coupled to the one or more memories and configured to cause the apparatus to:
transmit a radio bearer configuration message, wherein the radio bearer configuration message specifies at least a first list of available slot offset values for a first aperiodic sounding reference signal (A-SRS) resource set and a second list of available slot offset values for a second A-SRS resource set;
transmit an offset value indicating an offset;
transmit, in a first slot, a first A-SRS-triggering downlink control information (DCI) comprising:
a first A-SRS request indicator for indicating the first A-SRS resource set; and
a first DCI code point; and
based on the first DCI code point mapping to a first available slot offset value $t_1$ that is in the first list, determining a second slot as a $(t_1+1)$-th available slot counting from a first reference slot, wherein the first reference slot is the first slot plus the offset;
receive, in the second slot, a first A-SRS corresponding to the first A-SRS resource set;
transmit, in a third slot, a second A-SRS-triggering DCI comprising:
a second A-SRS request indicator for indicating the second A-SRS resource set; and
a second DCI code point;
based on the second DCI code point mapping to a second available slot offset value that is not configured in the second list and based on the second A-SRS resource set having only a single available slot offset value $t_2$, determine a fourth slot as a $(t_2+1)$-th available slot counting from a second reference slot, wherein the second reference slot is the third slot plus the offset; and receive, in the fourth slot, a second A-SRS corresponding to the second A-SRS resource set.

2. The apparatus of claim 1, wherein a plurality of A-SRS resource sets includes the first A-SRS resource set and the second A-SRS resource set, each A-SRS resource set of the plurality of A-SRS resource sets having a same number of available slot offset values.

3. The apparatus of claim 2, wherein the one or more processors are further configured to cause the apparatus to:
select the first DCI code point; and
wherein the radio bearer configuration message configures the plurality of A-SRS resource sets for a bandwidth and configures each DCI code point in a set of one or more DCI code points for each A-SRS resource set in the plurality of A-SRS resource sets.

4. An apparatus for wireless communication, comprising:
one or more memories; and
one or more processors coupled to the one or more memories and configured to cause the apparatus to:
receive a radio bearer configuration message, wherein the radio bearer configuration message specifies at least a first list of available slot offset values for a first aperiodic sounding reference signal (A-SRS) resource set and a second list of available slot offset values for a second A-SRS resource set;
receive an offset value indicating an offset;
receive, in a first slot, a first A-SRS-triggering downlink control information (DCI) comprising:
a first A-SRS request indicator for indicating the first A-SRS resource set; and
a first DCI code point; and
based on the first DCI code point mapping to a first available slot offset value $t_1$ that is in the first list, determine a second slot as a $(t_1+1)$-th available slot counting from a first reference slot, wherein the first reference slot is the first slot plus the offset;
transmit, in the second slot, a first A-SRS corresponding to the first A-SRS resource set;
receive, in a third slot, a second A-SRS-triggering DCI comprising:
a second A-SRS request indicator for indicating the second A-SRS resource set; and
a second DCI code point;
based on the second DCI code point mapping to a second available slot offset value that is not configured in the second list and based on the second A-SRS resource set having only a single available slot offset value $t_2$, determine a fourth slot as a $(t_2+1)$-th available slot counting from a second reference slot, wherein the second reference slot is the third slot plus the offset; and
transmit, in the fourth slot, a second A-SRS corresponding to the second A-SRS resource set.

5. The apparatus of claim 4, wherein:
the one or more processors are configured to cause the apparatus to transmit, in a fifth slot, a third A-SRS corresponding to a third A-SRS resource set indicated in a third A-SRS request indicator utilizing a default behavior when a third DCI code point of a third A-SRS triggering DCI maps to a third available slot offset value that is not configured for the third A-SRS resource set, and the default behavior comprises one or more of:
transmitting the third A-SRS using the third available slot offset value of '0'; or
transmitting the third A-SRS utilizing the default behavior by ignoring the third DCI code point and assuming that the third available slot offset value is that of a configured available slot offset value.

6. An apparatus for wireless communication, comprising:
one or more memories; and
one or more processors coupled to the one or more memories and configured to cause the apparatus to:
transmit a capability information signal indicating a capability to support an aperiodic sounding reference signal (A-SRS) triggering procedure;
receive a radio bearer configuration message for configuring a bandwidth, the radio bearer configuration message comprising an indication of support of the A-SRS triggering procedure and the radio bearer configuration message specifying at least a first list of available slot offset values for a first aperiodic sounding reference signal (A-SRS) resource set and a second list of available slot offset values for a second A-SRS resource set; and
based on the radio bearer configuration message indicating support of the A-SRS triggering procedure:
receive an offset value indicating an offset;
receive, in a first slot, a first A-SRS-triggering downlink control information (DCI) comprising:
a first A-SRS request indicator for indicating the first A-SRS resource set; and
a first DCI code point; and
based on the first DCI code point mapping to a first available slot offset value $t_1$ that is in the first list, determine a second slot as a $(t_1+1)$-th available slot counting from a first reference slot, wherein the first reference slot is the first slot plus the offset;
transmit, in the second slot, a first A-SRS corresponding to the first A-SRS resource set;
receive, in a third slot, a second A-SRS-triggering DCI comprising:
a second A-SRS request indicator for indicating the second A-SRS resource set; and
a second DCI code point;
based on the second DCI code point mapping to a second available slot offset value that is not configured in the second list and based on the second A-SRS resource set having only a single available slot offset value $t_2$, determine a fourth slot as a $(t_2+1)$-th available slot counting from a second reference slot, wherein the second reference slot is the third slot plus the offset; and
transmit, in the fourth slot, a second A-SRS corresponding to the second A-SRS resource set.

7. The apparatus of claim 6, wherein the radio bearer configuration message comprises information for configuring one or more A-SRS resource sets, and
wherein the radio bearer configuration message indicates the support of the A-SRS triggering procedure by configuring the first list of available slot offset values for the first A-SRS resource set.

8. The apparatus of claim 7, wherein the one or more processors are further configured to utilize the first available slot offset value to identify the second slot when the radio bearer configuration message indicates the support of the A-SRS triggering procedure.

9. The apparatus of claim 6, wherein the one or more processors are further configured to cause the apparatus to determine for the bandwidth, based on a maximum number of available slot offset values configured for any of one or more configured A-SRS resource sets for the bandwidth, a bit width of a bitfield for carrying the first available slot offset value on the first A-SRS-triggering DCI.

10. The apparatus of claim 9, wherein:
based on one or more configured A-SRS resource sets not being configured with an available slot offset value, and based on the one or more configured A-SRS resource sets being triggered, the one or more processors are further configured to cause the apparatus to transmit an A-SRS utilizing a default available slot offset value of t=0.

11. The apparatus of claim 6, wherein:
the bandwidth comprises a carrier comprising a plurality of bandwidth parts (BWPs),
the first A-SRS-triggering DCI corresponds to a first BWP of the plurality of BWPs, the first A-SRS-triggering DCI comprising a first A-SRS request indicator, and
the one or more processors are further configured to cause the apparatus to:
switch from the first BWP to a second BWP of the plurality of BWPs; and
receive the second A-SRS-triggering DCI corresponding to the second BWP,
the second A-SRS-triggering DCI comprising a second A-SRS request indicator.

12. The apparatus of claim 11, wherein:
the first available slot offset value has a first bit width, and the second available slot offset value has the first bit width.

13. The apparatus of claim 11, wherein the one or more processors are further configured to cause the apparatus to:
transmit a third A-SRS corresponding to a third triggered A-SRS resource set indicated in a third A-SRS-triggering DCI when a DCI code point in the third A-SRS-triggering DCI maps to a third available slot offset value that is configured for the third triggered A-SRS resource set.

14. A method of wireless communication operable at a scheduled entity, the method comprising:
transmitting a capability information signal indicating a capability to support an aperiodic sounding reference signal (A-SRS) triggering procedure;
receiving a radio bearer configuration message for configuring a bandwidth, the radio bearer configuration message comprising an indication of support of the A-SRS triggering procedure, wherein the radio bearer configuration message specifies at least a first list of available slot offset values for a first A-SRS resource set and a second list of available slot offset values for a second A-SRS resource set; and
based on the radio bearer configuration message indicating support of the A-SRS triggering procedure:
receiving an offset value indicating an offset;
receiving, in a first slot, a first A-SRS-triggering downlink control information (DCI) comprising:
a first A-SRS request indicator for indicating the first A-SRS resource set; and
a first DCI code point; and
based on the first DCI code point mapping to a first available slot offset value $t_1$ that is in the first list, determining a second slot as a $(t_1+1)$-th available slot counting from a first reference slot, wherein the first reference slot is the first slot plus the offset;
transmitting, in the second slot, a first A-SRS corresponding to the first A-SRS resource set;
transmit, in a third slot, a second A-SRS-triggering DCI comprising:
a second A-SRS request indicator for indicating the second A-SRS resource set; and
a second DCI code point;
based on the second DCI code point mapping to a second available slot offset value that is not configured in the second list and based on the second A-SRS resource set having only a single available slot offset value $t_2$, determine a fourth slot as a $(t_2+1)$-th available slot counting from a second reference slot, wherein the second reference slot is the third slot plus the offset; and
receive, in the fourth slot, a second A-SRS corresponding to the second A-SRS resource set.

15. The method of claim 14, wherein the radio bearer configuration message comprises information for configuring one or more A-SRS resource sets, and
wherein the radio bearer configuration message indicates the support of the A-SRS triggering procedure by configuring the first list of available slot offset values for the first A-SRS resource set.

16. The method of claim 15, further comprising utilizing the first available slot offset value to determine the second slot when the radio bearer configuration message indicates the support of the A-SRS triggering procedure.

17. The method of claim 14, further comprising determining for the bandwidth, based on a maximum number of available slot offset values configured for any of one or more configured A-SRS resource sets for the bandwidth, a bit width of a bitfield for carrying the first available slot offset value on the first A-SRS-triggering DCI.

18. The method of claim 17, wherein the method further comprises:
based on one or more configured A-SRS resource sets for the bandwidth not being configured with any available slot offset value, and based on the one or more configured A-SRS resource sets for the bandwidth being triggered, transmitting a third A-SRS utilizing a default available slot offset value of t=0.

19. The method of claim 14, wherein:
the bandwidth comprises a carrier comprising a plurality of bandwidth parts (BWPs),
the first A-SRS-triggering DCI corresponds to a first BWP of the plurality of BWPs, the first A-SRS-triggering DCI comprising a first A-SRS request indicator;
the method further comprises:
switching from the first BWP to a second BWP of the plurality of BWPs; and
receiving a third A-SRS-triggering DCI corresponding to the second BWP, the third A-SRS-triggering DCI comprising a second A-SRS request indicator.

20. The method of claim 19, wherein:
the first available slot offset value has a first bit width, and the second available slot offset value has the first bit width.

21. The method of claim 19, further comprising:
transmitting a third A-SRS corresponding to a third triggered A-SRS resource set indicated in the third A-SRS-triggering DCI when a third DCI code point in the third A-SRS-triggering DCI maps to a third available slot offset value that is configured for the third triggered A-SRS resource set.

* * * * *